US011785174B2

(12) United States Patent
Gao et al.

(10) Patent No.: US 11,785,174 B2
(45) Date of Patent: Oct. 10, 2023

(54) METHOD FOR IMPLANTING INFORMATION INTO VIDEO, COMPUTER DEVICE AND STORAGE MEDIUM

(71) Applicant: Tencent Technology (Shenzhen) Company Limited, Guangdong (CN)

(72) Inventors: Chenqiong Gao, Shenzhen (CN); Zelong Yin, Shenzhen (CN); Nianhua Xie, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 146 days.

(21) Appl. No.: 17/394,579

(22) Filed: Aug. 5, 2021

(65) Prior Publication Data

US 2021/0368112 A1 Nov. 25, 2021

Related U.S. Application Data

(63) Continuation of application No. PCT/CN2020/085939, filed on Apr. 21, 2020.

(30) Foreign Application Priority Data

May 9, 2019 (CN) .......................... 201910385878.4

(51) Int. Cl.
*H04N 9/68* (2023.01)
*H04N 5/272* (2006.01)

(52) U.S. Cl.
CPC .............. *H04N 5/272* (2013.01); *H04N 9/68* (2013.01)

(58) Field of Classification Search
None
See application file for complete search history.

(56) References Cited

U.S. PATENT DOCUMENTS

| 5,731,846 A | 3/1998 | Kreitman et al. |
| 10,205,889 B2 | 2/2019 | Affaticati |

(Continued)

FOREIGN PATENT DOCUMENTS

| CN | 1144588 A | 3/1997 |
| CN | 105191287 A | 12/2015 |

(Continued)

OTHER PUBLICATIONS

International Search Report and Written Opinion for priority application No. PCT/CN2020/085939, dated Jul. 23, 2020, 11p, in Chinese language.

(Continued)

*Primary Examiner* — Tapas Mazumder
(74) *Attorney, Agent, or Firm* — CROWELL & MORING LLP

(57) ABSTRACT

This disclosure provides a method for embedding information into a video, a computer device, and a storage medium. The method includes: constructing a model conforming to a pixel distribution characteristic of the first embedding region; controlling update of the model based on a subsequent to-be-processed frame of the reference frame; identifying a background and a foreground of a second embedding region in the to-be-processed frame based on the model; generating a template used for occluding the background and exposing the foreground; applying the template to to-be-embedded information to generate an updated to-be-embedded information by occluding region of the to-be-embedded information corresponding to the foreground; and overlaying the second embedding region with the updated to-be-embedded information, so that the foreground of the second embedding region is devoid of occlusion by the overlaid to-be-embedded information.

20 Claims, 11 Drawing Sheets

(56) References Cited

U.S. PATENT DOCUMENTS

| | | | |
|---|---|---|---|
| 2010/0067865 A1 | 3/2010 | Saxena et al. | |
| 2010/0315510 A1 | 12/2010 | Dunn et al. | |
| 2016/0140724 A1 | 5/2016 | Ji et al. | |
| 2017/0278289 A1* | 9/2017 | Marino | G06T 7/536 |
| 2018/0048894 A1 | 2/2018 | Chen et al. | |
| 2018/0357212 A1* | 12/2018 | Windmark | G06F 40/216 |
| 2019/0130215 A1 | 5/2019 | Kaestle et al. | |

FOREIGN PATENT DOCUMENTS

| | | | | |
|---|---|---|---|---|
| CN | 107347166 A | 11/2017 | | |
| CN | 107493488 A | 12/2017 | | |
| CN | 108419115 A | 8/2018 | | |
| CN | 108961304 A | 12/2018 | | |
| CN | 109461174 A | 3/2019 | | |
| CN | 110121034 A | 8/2019 | | |
| WO | WO 2008/008045 A1 | 1/2008 | | |
| WO | WO-2008008045 A1 * | 1/2008 | | G06K 9/00771 |
| WO | WO 2020/224428 A1 | 11/2020 | | |

OTHER PUBLICATIONS

English Language Translation of the International Search Report for priority application No. PCT/CN2020/085939, dated Jul. 23, 2020, 4p.

Concise Explanation of Relevance for First Search Report and Office Action for priority China application CN 201910385878.4 and International Written Opinion for priority application No. PCT/CN2020/085939, 2p.

Jing Chang, "Research on the Billboard Detection in Sports Video", dated Apr. 20, 2017, 3p, in Chinese language with English Abstract, printed from www.onki.net on Aug. 4, 2021.

First Search Report and Office Action for priority Chinese application No. 201910385878.4 dated Dec. 28, 2020, 6p, in Chinese language.

Extended European Search Report for application No. EP 20802358.0 dated May 27, 2022, 8p.

* cited by examiner

METHOD FOR IMPLANTING INFORMATION INTO VIDEO, COMPUTER DEVICE AND STORAGE MEDIUM

RELATED APPLICATION

This application is a continuation of PCT Application No. PCT/CN2020/085939, filed Apr. 21, 2020 and entitled "METHOD FOR IMPLANTING INFORMATION INTO VIDEO, COMPUTER DEVICE AND STORAGE MEDIUM," which claims priority to Chinese Patent Application No. 201910385878.4, entitled "METHOD AND APPARATUS FOR IMPLANTING INFORMATION INTO VIDEO AND STORAGE MEDIUM" and filed on May 9, 2019. The above applications are incorporated herein by reference in their entireties.

TECHNICAL FIELD

This disclosure relates to graphics and image technologies, and in particular, to a method for embedding information into a video, a computer device, and a storage medium.

BACKGROUND

Videos are mainstream information carriers at present. With development of the Internet, especially the mobile Internet, the speed of video propagation is rapidly increased, and videos becomes important paths of information propagation. Information implantation/embedding for a video means that, without affecting main content (for example, foreground content) of a video, various kinds of information, such as promotion information including an image, text, or a combination thereof, are superposed in a background of the video. The term implanting/implantation may be alternatively referred to as embedding.

The main content of the video (for example, a character in the video and a special effect added during video post-production) is presented in a form of foreground content. To enable users to always see the main content of the video when playing the video, information needs to be incorporated into the background content of the video. The related technologies lack effective solutions.

SUMMARY

Embodiments of this disclosure provide a method for embedding information into a video, a computer device, and a storage medium, so that information can be efficiently incorporated into background content of the video.

The technical solutions in the embodiments of this disclosure are implemented as follows.

An embodiment of this disclosure provides a method for embedding information into a video, including:
   constructing a model for each of a plurality of pixels comprised by a first embedding region in a reference frame of the video, the model conforming to a pixel distribution characteristic of the first embedding region;
   controlling update of the model based on a subsequent to-be-processed frame of the reference frame;
   identifying a background and a foreground of a second embedding region in the to-be-processed frame based on the model;
   generating a template used for occluding the background and exposing the foreground;
   applying the template to to-be-embedded information to generate an updated to-be-embedded information by occluding region of the to-be-embedded information corresponding to the foreground; and
   overlaying the second embedding region with the updated to-be-embedded information, so that the foreground of the second embedding region is devoid of occlusion by the overlaid to-be-embedded information.

An embodiment of this disclosure provides an apparatus for embedding information into a video, including:
   a model construction module, configured to construct a model that conforms to a pixel distribution characteristic of an embedding region in a reference frame, and control update of the model based on a subsequent to-be-processed frame of the reference frame;
   a template generation module, configured to: identify a background and a foreground of an embedding region in the to-be-processed frame based on the model, and generate a template used for occluding the background and exposing the foreground;
   a template application module, configured to apply the template to to-be-embedded information to shield content that is in the to-be-embedded information and that occludes the foreground; and
   an information overlaying module, configured to overlay the embedding region in the to-be-processed frame with the updated to-be-embedded information, so that the foreground is highlighted relative to the to-be-embedded information.

In an exemplary implementation, the apparatus further includes:
   a parameter initialization module, configured to initialize, for each pixel in the embedding region in the reference frame, at least one sub-model corresponding to the pixel and a weight corresponding to the at least one sub-model; and
   a weight mixing module, configured to mix, based on the initialized weight, the at least one sub-model constructed for each pixel to form a model corresponding to the pixel.

In an exemplary implementation, the apparatus further includes:
   a weight maintaining module, configured to: reduce, in response to that the embedding region in the to-be-processed frame is occluded by the foreground, a rate at which the model is fitted into the embedding region in the to-be-processed frame; and
   a fitting acceleration module, configured to: increase, in response to that the embedding region in the to-be-processed frame is not occluded by the foreground and illumination of the embedding region in the to-be-processed frame changes, a rate at which the model is fitted into the embedding region in the to-be-processed frame.

In an exemplary implementation, the apparatus further includes:
   a parameter update module, configured to update, in response to that a pixel in the embedding region in the to-be-processed frame matches at least one sub-model in a corresponding model, a parameter of the matched sub-model and keep a parameter of a sub-model, that does not match the pixel, in the corresponding model unchanged.

In an exemplary implementation, the apparatus further includes:
  a first matching module, configured to match a color value of each pixel in the embedding region in the to-be-processed frame with a sub-model in a model corresponding to the pixel; and
  an identification module, configured to: identify a matched pixel as a pixel of the background, and identify a mismatched pixel as a pixel of the foreground.

In an exemplary implementation, the apparatus further includes:
  a filling module, configured to: fill, for a pixel that is in the embedding region in the to-be-processed frame and that is identified as a pixel of the background, a binary number one in a corresponding empty position in the template; and
  fill, for a pixel that is in the embedding region in the to-be-processed frame and that is identified as a pixel of the foreground, a binary number zero in a corresponding position in the template filled with the binary number one.

In an exemplary implementation, the apparatus further includes: an operation module, configured to perform a multiplication operation on the to-be-embedded information and the binary number filled in each position in the template.

In an exemplary implementation, the apparatus further includes:
  a second matching module, configured to: match, in response to that a video is formed by using a motion shot, a feature extracted from an embedding region in a reference frame of the video with a feature extracted from the to-be-processed frame; and
  a region determining module, configured to: determine, in response to successful matching, that the to-be-processed frame includes an embedding region corresponding to the embedding region in the reference frame.

In an exemplary implementation, the apparatus further includes:
  a region transform module, configured to: in response to that a video is formed by using a motion shot,
  before the controlling update of the model based on a subsequent to-be-processed frame of the reference frame, transform the embedding region in the to-be-processed frame, so that a position of each pixel in the transformed embedding region is consistent with a position of a corresponding pixel in the embedding region in the reference frame; and
  a template inverse transform module, configured to: before the applying the template to to-be-embedded information, perform inverse transform of the transform on the template, so that a position of each binary number in the transformed template is consistent with a position of a corresponding pixel in the embedding region in the to-be-processed frame.

In an exemplary implementation, the apparatus further includes: a region positioning module, configured to: position, in response to that a video is formed by using a static shot, a region of a corresponding position in the to-be-processed frame based on a position of the embedding region in the reference frame, to determine the embedding region in the to-be-processed frame.

In an exemplary implementation, the apparatus further includes:
  a first determining module, configured to determine, in response to that first color space distribution of the embedding region in the to-be-processed frame and first color space distribution of the embedding region in the reference frame meet a first difference condition, that the embedding region in the to-be-processed frame is occluded by the foreground; and
  a second determining module, configured to determine, in response to that second color space distribution of the embedding region in the to-be-processed frame and second color space distribution of the embedding region in the reference frame meet a second difference condition, that illumination of the embedding region in the to-be-processed frame changes.

An embodiment of this disclosure provides an electronic device, including:
  a memory, configured to store executable instructions; and
  at least one processor, configured to, when executing the executable instructions stored in the memory, perform the steps comprising:
  constructing a model for each of a plurality of pixels comprised by a first embedding region in a reference frame of a video, the model conforming to a pixel distribution characteristic of the first embedding region;
  controlling update of the model based on a subsequent to-be-processed frame of the reference frame;
  identifying a background and a foreground of a second embedding region in the to-be-processed frame based on the model;
  generating a template used for occluding the background and exposing the foreground;
  applying the template to to-be-embedded information to generate an updated to-be-embedded information by occluding region of the to-be-embedded information corresponding to the foreground; and
  overlaying the second embedding region with the updated to-be-embedded information, so that the foreground of the second embedding region is devoid of occlusion by the overlaid to-be-embedded information.

An embodiment of this disclosure provides a computer device. The computer device comprises:
  a memory, configured to store executable instructions; and
  at least one processor, configured to, when executing the executable instructions stored in the memory, perform the steps comprising:
  constructing a model, which conforms to a pixel distribution characteristic of an embedding region in a reference frame, respectively for a plurality of pixels comprised by the embedding region in the reference frame;
  controlling update of the model based on a subsequent to-be-processed frame of the reference frame;
  identifying a background and a foreground of an embedding region in the to-be-processed frame based on the model;
  generating a template used for occluding the background and exposing the foreground;
  applying the template to to-be-embedded information to shield content that is in the to-be-embedded information and that occludes the foreground to obtain an updated to-be-embedded information; and
  overlaying the embedding region in the to-be-processed frame with the updated to-be-embedded information, so that the foreground is devoid of occlusion of the to-be-embedded information.

An embodiment of this disclosure provides a non-transitory computer-readable storage medium, storing executable instructions, configured to, when executed by at least one processor, cause an electronic device to perform the steps, comprising:

constructing a model for each of a plurality of pixels comprised by a first embedding region in a reference frame of a video, the model conforming to a pixel distribution characteristic of the first embedding region;

controlling update of the model based on a subsequent to-be-processed frame of the reference frame;

identifying a background and a foreground of a second embedding region in the to-be-processed frame based on the model;

generating a template used for occluding the background and exposing the foreground;

applying the template to to-be-embedded information to generate an updated to-be-embedded information by occluding region of the to-be-embedded information corresponding to the foreground; and overlaying the second embedding region with the updated to-be-embedded information, so that the foreground of the second embedding region is devoid of occlusion by the overlaid to-be-embedded information.

An embodiment of this disclosure provides a computer program product, storing a computer program, configured to implement the method provided in the embodiment of this disclosure when being loaded and executed by a processor.

The embodiments of this disclosure have the following beneficial effects:

A model is constructed based on a pixel distribution characteristic of an embedding region in a reference frame, and a background and a foreground of an embedding region in a to-be-processed frame are identified according to the model, so as to generate a template that can occlude the background and expose the foreground. After the template is applied to to-be-embedded information, content that is in the to-be-embedded information and that occludes the foreground may be filtered out, so as to ensure that information embedded into a video does not occlude a foreground of the video, and the embedded information can be better incorporated into a background of the video, thereby bringing better viewing experience.

DESCRIPTION OF EMBODIMENTS

To make objectives, technical solutions, and advantages of this disclosure clearer, the following describes this disclosure in further detail with reference to accompanying drawings. The described embodiments are not to be considered as a limitation to this disclosure. All other embodiments obtained by a person of ordinary skill in the art without creative efforts shall fall within the protection scope of this disclosure.

In the following description, the term "some embodiments" describes subsets of all possible embodiments, but it may be understood that "some embodiments" may be the same subset or different subsets of all the possible embodiments, and may be combined with each other without conflict.

In the following descriptions, the included term "first/second/third" is merely intended to distinguish similar objects but does not necessarily indicate specific order of an object. It may be understood that "first/second/third" is interchangeable in terms of specific order or sequence if permitted, so that the embodiments of this disclosure described herein can be implemented in a sequence in addition to the sequence shown or described herein.

Unless otherwise defined, meanings of all technical and scientific terms used in this specification are the same as those usually understood by a person skilled in the art to which this disclosure belongs. Terms used in this specification are merely intended to describe objectives of the embodiments of this disclosure, but are not intended to limit this disclosure.

Before the embodiments of this disclosure are further described in detail, a description is made on nouns and terms in the embodiments of this disclosure, and the nouns and terms in the embodiments of this disclosure are applicable to the following explanations.

(1) A mask, also referred to as a filter or template, is an image used for shielding (some or all) pixels in a to-be-processed image, so that a part of a specific image is highlighted.

The mask may be a two-dimensional matrix array, and sometimes may be a multi-valued image. The image mask is mainly used for shielding some regions of the image. An AND operation is performed on each pixel in an original image and a binary number (also referred to as mask code) in the same position in a mask. For example, 1 & 1=1; 1 & 0=0.

Figure 1A:
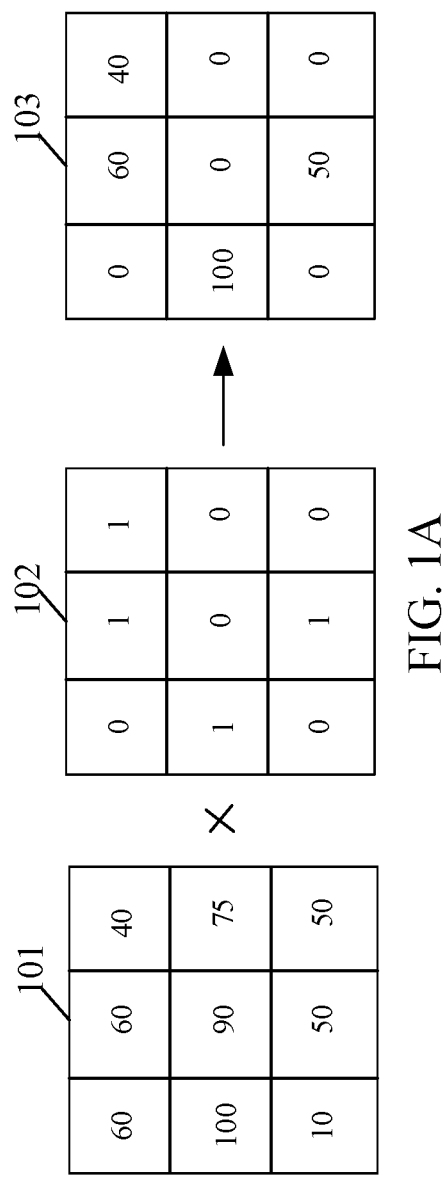
FIG. 1A is a schematic diagram of processing an image by using a mask according to an embodiment of this disclosure.

For example, a 3*3 image shown in 101 in FIG. 1A and a 3*3 mask shown in 102 in FIG. 1A are operated to obtain a result image shown in 103 in FIG. 1A.

(2) A static shot (FS), i.e., a fixed shot (FS), is a shot that has a fixed camera position, lens optical axis, and focal length. An object (a real object such as a human, and a virtual object such as an animated avatar) in a video of a static shot may be static, or may be dynamic (which means coming in and going out the image), but a frame enclosing the image is not moved, that is, an image range and a field of view area are always unchanged.

(3) A motion shot is a shot that performs photographing by using various movements (for example, changes of a position, an optical axis, and a focal length). A frame enclosing an image in a video of the motion shot is changeable, that is, an image range and a field of view area are changeable, for example, changes of an imaging distance, size, and angle.

(4) A background is a photographic field behind a subject in a video image and can represent a space-time environment in which a person or an event is located, for example, a building, a wall, and a ground behind a person.

(5) A foreground is content that is in a video image and that is closer to a lens than the background is, and is a subject of video presentation, for example, a person standing in front of a building.

To better understand the method for embedding information into a video according to the embodiments of this disclosure, a solution to a problem of occluding the embedded information in the video in the related art is first analyzed and described.

Background subtraction means setting a fixed threshold manually, subtracting a new region including a potential foreground from an original background region in a video, and determining, through comparison with the threshold, whether the background is occluded by the foreground, so as to form a mask for a corresponding occluded part. In the solution, the foreground and the background are determined based on the manually selected threshold. Therefore, an automation level is low, and frequent adjustment is required. When the foreground and the background are close to each other in terms of color, the subtraction between the foreground and the background is not complete, and accuracy is relatively low.

Gaussian mixture background modeling for a static shot means that a background without occlusion is selected for modeling for the static shot, and whether a background of a subsequent image frame is occluded by a foreground is discriminated by using a model, so as to form a mask for the occluded part. The solution can only be used for a video of a fixed shot. For a video of a motion shot, a background is likely identified as a foreground, and accuracy is also relatively low.

Track classification means that a target point of interest is calibrated in an initial frame, a track of a feature point in embedded information is obtained by using a motion tracking model, and a foreground and a background are discriminated based on the track. The solution is sensitive to noise in an image frame, and accuracy depends on the motion tracking model. If a selected motion tracking model is not appropriate, accuracy of foreground and background discrimination will be greatly affected.

For the technical problems in the foregoing solutions, certain embodiments of this disclosure provide a method for embedding information into a video. With reference to a modeling method based on a video sequence and full-pixel statistics, background modeling is automatically selected for a video of a static shot, a learning rate of a subsequent frame is automatically updated to optimize the model, and a statistical feature is used for determining whether an occlusion exists and a mask is formed. For a video of a motion shot, pixel statistics modeling is performed by using a standard image mapped to a reference frame by using a transform technology, and a mask of an occlusion is obtained by returning to an image of a subsequent frame, without needing a motion tracking model. Therefore, real-time performance is high, a range of application is wide, robustness is strong, and automation efficiency is high.

The following describes an exemplary application for implementing an apparatus in the embodiments of this disclosure. The apparatus provided in the embodiments of this disclosure may be implemented as a mobile terminal with a wireless communication capability, such as a mobile phone, a tablet computer, or a notebook computer, or may be implemented as a desktop computer, or the like that has a computing function but cannot be moved conveniently. In addition, the apparatus provided in the embodiments of this disclosure may also be implemented as a server. The server may be one server, a server cluster including a plurality of servers, a cloud computing center, or the like. This is not limited herein.

Figure 1B:
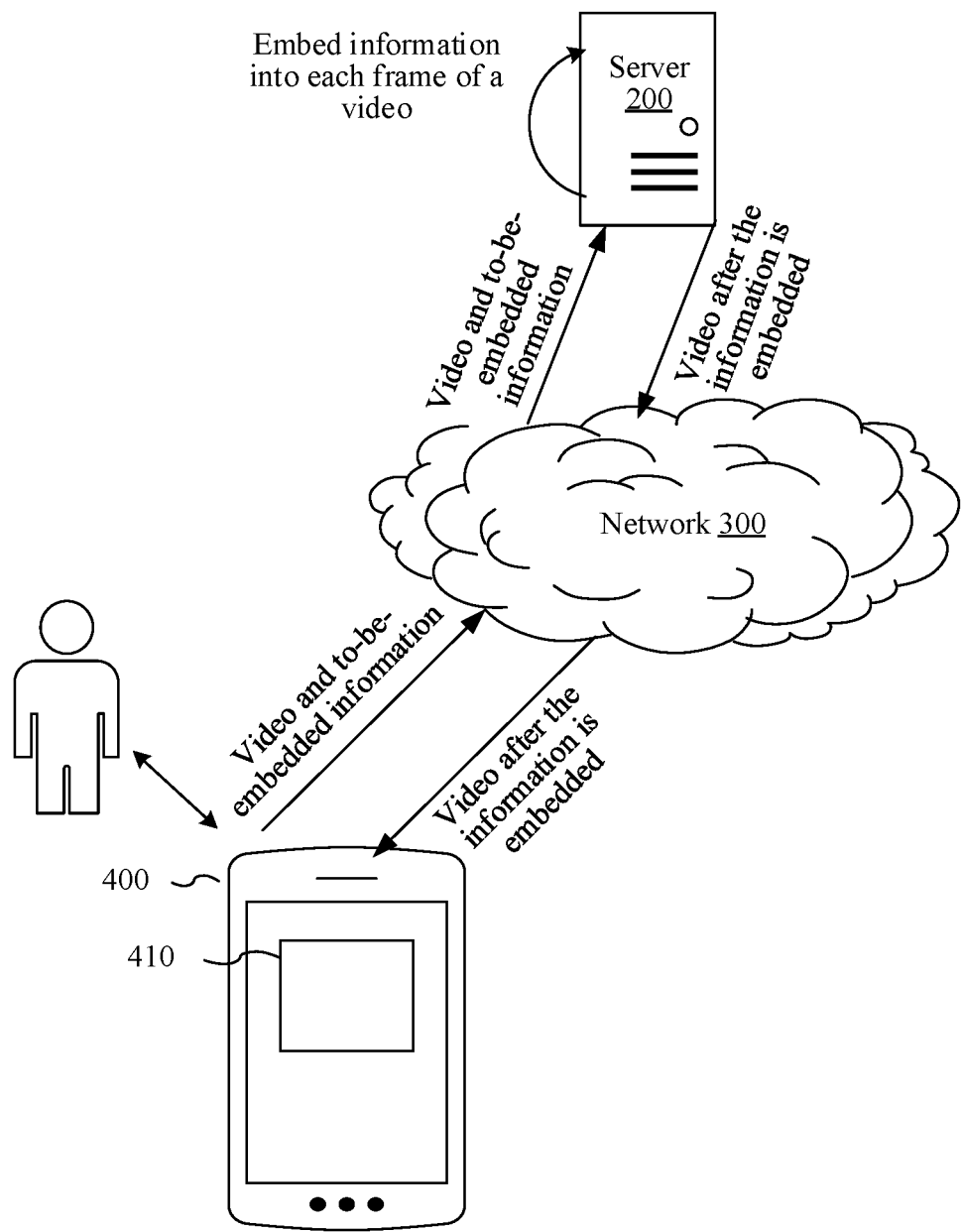
FIG. 1B is a schematic diagram of an application scenario according to an embodiment of this disclosure.

Referring to FIG. 1B, FIG. 1B is a schematic diagram of an application scenario according to an embodiment of this disclosure. To support an exemplary application, a terminal 400 is connected to a server 200 by using a network 300. The network 300 may be a wide area network or a local area network, or a combination thereof, and implements data transmission by using a wireless link.

In response to that the terminal 400 wants to implant information into a video, and the to-be-embedded information may be an advertisement, and the video may be a video recorded by using the terminal, the terminal 400 may transmit the video and the to-be-embedded information to the server 200 and request the server 200 to implant the information into the video. In this case, after receiving the video and the to-be-embedded information, the server 200 adds the to-be-embedded information to each frame of the video by using the method for embedding information into a video provided in the embodiment of this disclosure, encapsulates the video to obtain an encapsulated video file, and finally transmits the encapsulated video file to the terminal 400. The terminal 400 may publish the video embedded with the advertisement.

In some embodiments, after the terminal 400 records a video and determines to-be-embedded information, the terminal 400 adds the to-be-embedded information to each frame of the video by using the method for embedding information into a video provided in the embodiment of this disclosure, encapsulates the video to obtain a video file, and then publishes the video embedded with an advertisement by using a video watching application (APP). To reduce an operation amount of the terminal and improve implantation efficiency, the terminal usually performs information implantation by itself for a video with relatively short duration.

In some implementations, when the terminal 400 wants to implant information into a video, and the video is a video stored in the server 200, the terminal 400 may transmit the to-be-embedded information and identification information of the video to the server 200, so as to request the server 200 to add the to-be-embedded information to the video corresponding to the identification information. The server 200 determines a corresponding video file based on the identification information, implants the to-be-embedded information into the video file, encapsulates to obtain an encapsulated video file, and transmits the encapsulated video file to the terminal 400.

The apparatus provided in this embodiment of this disclosure may be implemented in a manner of hardware or a combination of hardware and software. The following describes various exemplary implementations of the apparatus provided in this embodiment of this disclosure.

Figure 2:
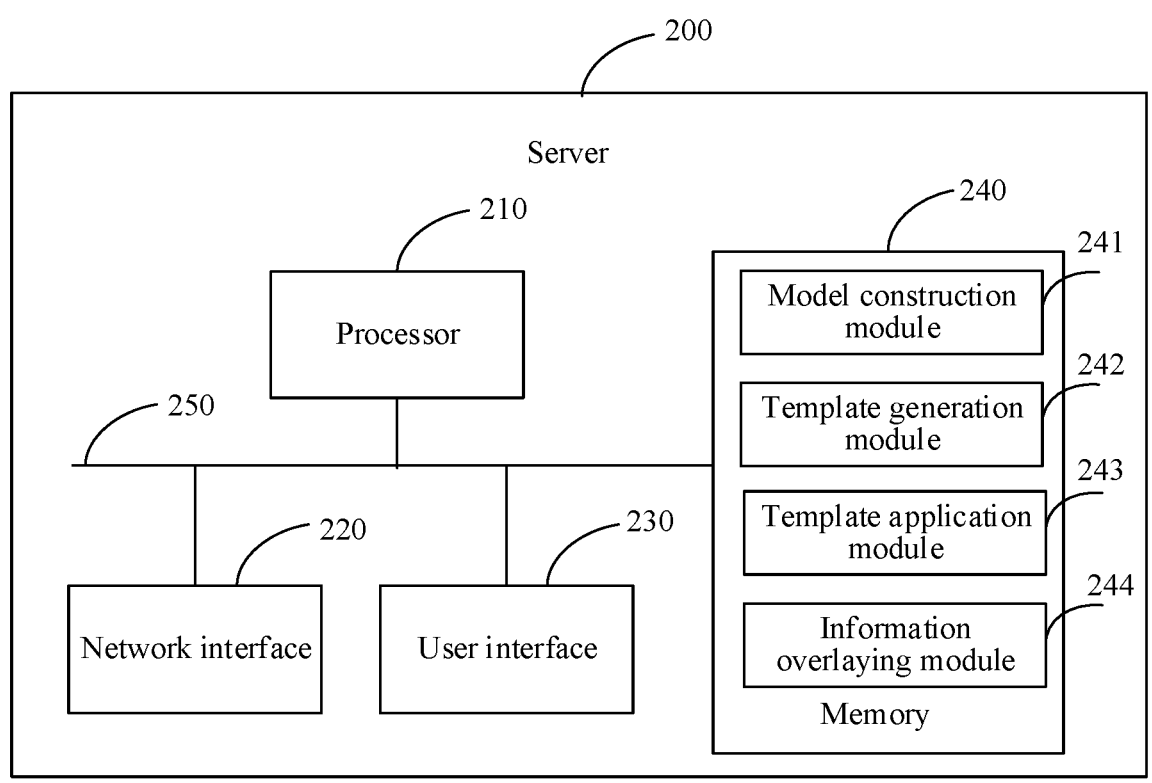
FIG. 2 is an exemplary schematic structural diagram of an apparatus according to an embodiment of this disclosure.

FIG. 2 is an exemplary schematic structural diagram of a server 200 according to an embodiment of this disclosure. The server 200 may be a desktop server, or may be a server cluster including a plurality of servers, a cloud computing center, or the like. According to the structure of the server 200, an exemplary structure of an apparatus when implemented as a server is foreseeable. Therefore, the structure described herein is not to be considered as a limitation. For example, some components described below may be omitted, or components not described below may be added to meet specific requirements of some applications.

The server 200 shown in FIG. 2 includes at least one processor 210, a memory 240, at least one network interface 220, and a user interface 230. All the components in the terminal 200 are coupled together by using a bus system 250. It may be understood that the bus system 250 is configured to implement connection and communication between the components. In addition to a data bus, the bus system 250 further includes a power bus, a control bus, and a status signal bus. However, for ease of clear description, all types of buses are marked as the bus system 250 in FIG. 2.

The user interface 230 may include a display, a keyboard, a mouse, a trackball, a click wheel, a key, a button, a touchpad, a touch screen, or the like.

The memory 240 may be a volatile memory or a non-volatile memory, or may include a volatile memory and a non-volatile memory. The non-volatile memory may be a read-only memory (ROM). The volatile memory may be a random access memory (RAM). The memory 240 described in this embodiment of this disclosure is to include any other suitable type of memories.

The memory 240 in this embodiment of this disclosure can store data to support operation of the server 200. An example of the data includes any computer program to be operated on the server 200, for example, an operating system and an application program. The operating system includes various system programs, such as framework layers, kernel library layers, and driver layers used for implementing various basic services and processing hardware-based tasks. The application program may include various application programs.

For example, the method provided in this embodiment of this disclosure is implemented by using a combination of software and hardware. The method provided in this embodiment of this disclosure may be directly embodied as a combination of software modules executed by the processor 210. The software module may be located in a storage medium, the storage medium is located in the memory 240, and the processor 210 reads executable instructions included in the software module in the memory 240, and implements, in combination with necessary hardware (for example, including the processor 210 and another component connected to the bus system 250), the method provided in the embodiment of this disclosure.

For example, the processor 210 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

In combination with the exemplary applications and implementations of the apparatus according to the embodiment of this disclosure, the method according to the embodiment of this disclosure is described. The method provided in the embodiment of this disclosure is applied to an execution device. The execution device may be a server, or may be a terminal. That is, the method provided in the embodiment of this disclosure may be executed by a server, or may be executed by a terminal. The server may be a desktop server, or may be a server cluster including a plurality of servers, a cloud computing center, or the like. The terminal may be a mobile terminal that has a wireless communication capability, such as a mobile phone, a tablet computer, or a notebook computer, or may be implemented as a desktop computer, or the like that has a computing function but cannot be moved conveniently.

Figure 3:
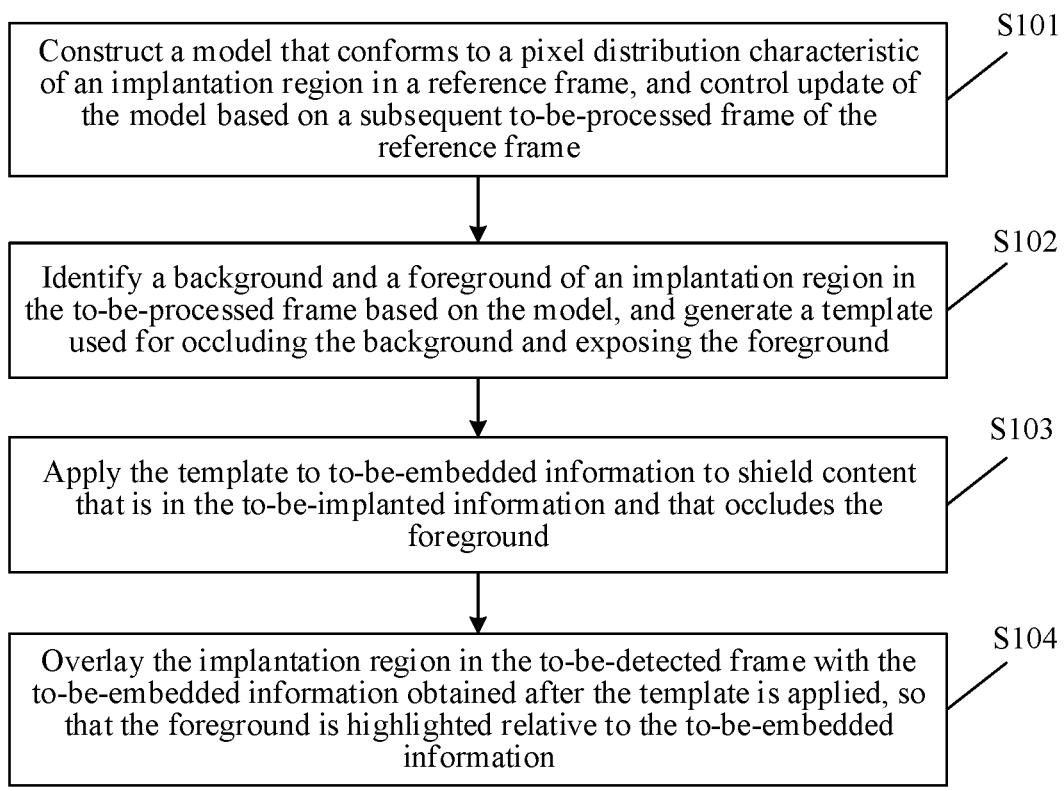
FIG. 3 is a schematic flowchart of an implementation of a method for embedding information into a video according to an embodiment of this disclosure.

FIG. 3 is a schematic flowchart of an implementation of a method for embedding information into a video according to an embodiment of this disclosure. References are made to steps shown in FIG. 3 for description.

Step S101: Construct a model that conforms to a pixel distribution characteristic of an embedding region in a reference frame, and control update of the model based on a subsequent to-be-processed frame of the reference frame.

Herein, the reference frame may be a frame of image into which information has been embedded, and a region in which the embedded information is located is the embedding region. The reference frame and the embedding region may be manually set, or may be automatically selected by using technologies such as machine learning and deep learning.

The reference frame may be an image frame in a video, and includes at least an embedding region, where the embedding region is planted with to-be-embedded information, and the to-be-embedded information is not occluded. For example, the reference frame may be an image frame in which an embedding region appears for the first time in a video, the embedding region is planted with to-be-embedded information, and the to-be-embedded information is not occluded. For example, the to-be-embedded information is an advertisement. The reference frame may be an image frame in which a complete advertisement region (such as a specific region on a wall or the ground, where the specific region is sufficient to fully display an advertisement) appears for the first time in a video.

For example, the reference frame may be an image frame in which a target object related to the to-be-embedded information appears, or an image frame in which a keyword related to the to-be-embedded information appears in a displayed caption. Assuming that the to-be-embedded information is an advertisement of an air conditioner of a certain brand, an image frame in which an air conditioner appears in the video may be used as a reference frame, or an image frame in which a keyword such as "cold" or "hot" appears may be used as a reference frame.

The embedding region may be manually delimited, for example, may be a region in an upper right corner of the image frame, or may be a region in an upper middle of the image frame, or certainly, may be a specific region that is automatically identified, for example, a related region such as the ground, a wall, or the sky. The embedding region in the reference frame cannot be occluded by a foreground. Therefore, during model initialization, pixel distribution of the embedding region can be completely learned.

When the model that conforms to the pixel distribution characteristics of the embedding region in the reference frame is being constructed, a model of each pixel in the embedding region is to be constructed. For example, a Gaussian mixture model (GMM) of each pixel in the embedding region may be constructed. In this case, step S101 may be implemented by first initializing a GMM predefined for each pixel according to the each pixel in the embedding region in the reference frame, where the GMM includes a plurality of Gaussian modes (where in some embodiments, the Gaussian mode may also be referred to as a mode/Gaussian component/sub-model); initializing parameters in the Gaussian mode; and obtaining parameters to be used subsequently. Then, each pixel in an embedding region in each subsequent to-be-processed frame is processed to determine whether the pixel matches a mode (that is, a Gaussian mode). If the pixel matches a mode, the pixel is classified into the mode, and a weight of the mode is updated according to a new pixel value. If the pixel does not match a mode, a Gaussian mode is established by using the pixel, and a parameter is initialized, so as to replace a mode with the smallest weight in the original mode.

Step S102: Identify a background and a foreground of an embedding region in the to-be-processed frame based on the model, and generate a template used for occluding the background and exposing the foreground.

Herein, step S102 may be implemented by successively matching each pixel in the embedding region in the to-be-processed frame with each mode in the corresponding model. If a pixel has a matched mode, it is considered that the pixel is a background pixel, and if the pixel has no matched node, it is considered that the pixel is a foreground pixel.

After each pixel in the embedding region is identified as a foreground or a background, the template used for occluding the background and exposing the foreground may be generated by using the identification result. Further, when a pixel is identified as a background pixel, a value corresponding to the pixel in the template may be set to 1. If a pixel is identified as a foreground pixel, a value corresponding to the pixel in the template is set to 0. 0 and 1 herein are binary numbers, that is, the template is a mask formed by binary numbers 0 and 1.

Step S103: Apply the template to to-be-embedded information to shield content that is in the to-be-embedded information and that occludes the foreground.

Herein, step S103 may be implemented by performing a multiplication operation on the to-be-embedded information and the template. In this embodiment and another embodiment, performing the multiplication operation on the to-be-embedded information and the template may be performing a multiplication operation on the to-be-embedded information and a binary number filled in each position in the template. An implementation may be performing a multiplication operation on a pixel of the to-be-embedded information and a binary number of a corresponding position in the template. In the template, a value corresponding to a background pixel is 1, and a value corresponding to a foreground pixel is 0. Therefore, when the multiplication operation is performed on the to-be-embedded information and the template, the content that is in the to-be-embedded information and that occludes the foreground is shielded, but this does not affect content that is in the to-be-embedded information and that does not occlude the foreground.

Step S104: Overlay the embedding region in the to-be-processed frame with the updated to-be-embedded information, so that the foreground is highlighted relative to the to-be-embedded information.

Herein, in step S103, the template is applied to the to-be-embedded information, and the content that is in the to-be-embedded information and that occludes the foreground is shielded. Therefore, when the embedding region in the to-be-processed frame is overlaid with the updated to-be-embedded information, the to-be-embedded information does not occlude the foreground part in the to-be-processed frame, thereby bringing better viewing experience.

When to-be-embedded information is embedded into a video by using the method provided in this embodiment of this disclosure, first a model needs to be constructed for each pixel based on a pixel distribution characteristic of an embedding region in a reference frame. A parameter of the model may be updated according to each pixel of an embedding region in a to-be-processed frame, and then, a template, which can occlude the background, but does not occlude the foreground, is generated based on a foreground pixel and a background pixel of the embedding region in the to-be-processed frame. Then, the template is applied to the to-be-embedded information. Finally, the embedding region in the to-be-processed frame is overlaid with the updated to-be-embedded information. The generated template can occlude the background but does not occlude the foreground. Therefore, after the template is applied to the to-be-embedded information, the content that is in the to-be-embedded information and that occludes the foreground can be shielded, so that after the information is embedded into the to-be-processed frame, the foreground part in the to-be-processed frame is not occluded, thereby ensuring video viewing experience.

Figure 4:
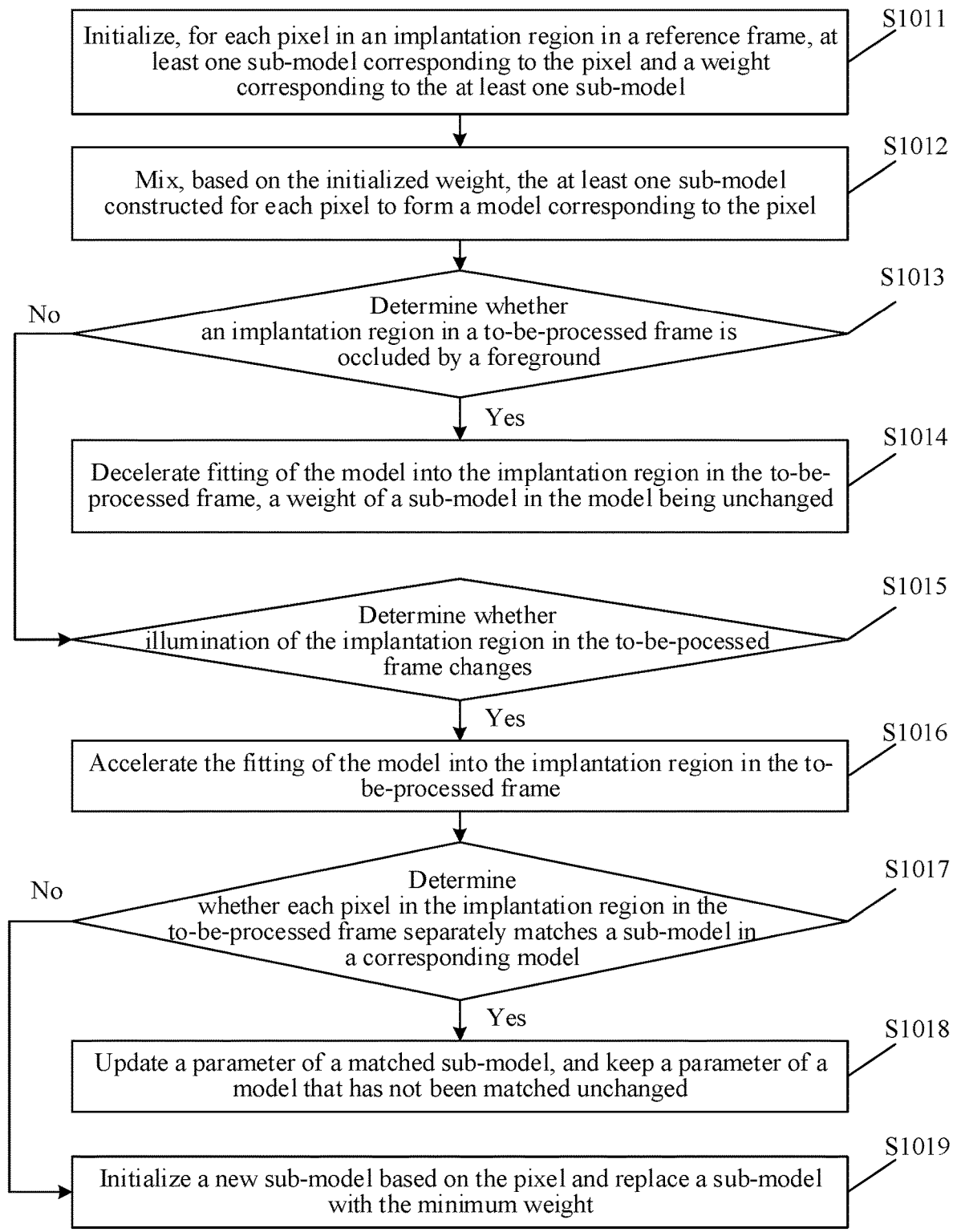
FIG. 4 is a schematic flowchart of an implementation of constructing and updating a model according to an embodiment of this disclosure.

In some embodiments, FIG. 4 is a schematic flowchart of an implementation of constructing and updating a model according to an embodiment of this disclosure. Step S101 may be implemented by using steps shown in FIG. 4.

Step S1011: Initialize, for each pixel in the embedding region in the reference frame, at least one sub-model corresponding to the pixel and a weight corresponding to the at least one sub-model.

In this embodiment of this disclosure, the model is constructed at a granularity of pixel, that is, a model is constructed for each pixel, and a model of a pixel may correspond to at least one sub-model. That is, a model of a pixel may correspond to one sub-model, or may correspond to a plurality of sub-models.

For example, a model of a pixel may be a GMM, and the model includes two or more sub-models, and may generally include three to five sub-models. The sub-model may be a Gaussian probability distribution function, and initializing the sub-model is at least initializing a parameter of the sub-model, where the parameter of the sub-model may be a parameter such as a mean, a variance, or a weight. When the parameter of the sub-model is initialized, the parameter of the sub-model may be set to a preset value. During initialization, the variance is set as large as possible, and the weight is set as small as possible. This setting is because the initialized Gaussian model is an inaccurate model. A range of the initialized Gaussian model needs to be continuously reduced, and a parameter value thereof needs to be updated, so as to obtain the most likely Gaussian model. A larger variance is set so that a larger quantity of pixels are matched with sub-models, so as to obtain a model that accurately represents a distribution characteristic of color values of pixels among frames of a video.

In some embodiments, the model may alternatively be a single Gaussian model. In this case, only one sub-model is required, and a parameter of the sub-model may be a mean, a variance, or the like. Because the single Gaussian model is applicable to a scene with a single invariant background, a GMM is usually constructed for subsequent processing.

Step S1012: Mix, based on the initialized weight, the at least one sub-model constructed for each pixel to form a model corresponding to the pixel.

Herein, it is assumed that each pixel has three sub-models, which are respectively $F_1$, $F_2$, and $F_3$, and corresponding weights are respectively $K_1$, $K_2$, and $K_3$. As such, step S1012 may be implemented by using formula (1-1):

$$F_m = K_1 * F_1 + K_2 * F_2 + K_3 * F_3 \quad (1-1);$$

where $F_m$ is a model corresponding to a pixel.

In some embodiments, simple mathematical manipulation may also be performed on formula (1-1) to form a model corresponding to a pixel.

The model that conforms to the pixel distribution characteristic of the embedding region in the reference frame is constructed by performing step S1011 and step S1012.

Step S1013: Determine whether the embedding region in the to-be-processed frame is occluded by the foreground.

In some embodiments, first color space distribution of the embedding region in the to-be-processed frame and first color space distribution of the embedding region in the reference frame may be acquired first. Then, a difference between the first color space distribution of the embedding region in the to-be-processed frame and the first color space distribution of the embedding region in the reference frame is determined, so as to determine, by determining whether the difference meets a first difference condition, whether the embedding region in the to-be-processed frame is occluded by the foreground.

For example, the embedding region in the reference frame is not occluded by the foreground. If the first color space distribution of the embedding region in the to-be-processed frame and the first color space distribution of the embedding region in the reference frame meet the first difference condition, it indicates that they are greatly different, and that the embedding region in the to-be-processed frame is occluded by the foreground, and step S1014 is performed. If the first color space distribution of the embedding region in the to-be-processed frame and the first color space distribution of the embedding region in the reference frame do not meet the first difference condition, it indicates that they are slightly different, and that the embedding region in the to-be-processed frame is not occluded by the foreground, and in this case, step S1015 is performed.

In some embodiments, the first color space distribution may be red green blue (RGB) space distribution. Acquiring the first color space distribution of the embedding region may be acquiring an RGB histogram of the embedding region. For example, 256 grayscales may be divided into 32 intervals, and distribution of pixels of the embedding region in the 32 intervals is counted to obtain an RGB histogram.

The first difference condition may be used for indicating the maximum difference between the first color space distribution of the embedding region in the reference frame and the first color space distribution of the embedding region in the to-be-processed frame when it is determined that no occlusion exists in the embedding region in the to-be-processed frame. For example, it is assumed that there are M intervals in total, and the first difference condition may be that a difference between quantities of pixels in 30%*M intervals is outside a quantity threshold range. For example, there are 32 intervals, and the first difference condition may be that a difference between quantities of pixels in at least 9 intervals exceeds 10.

Step S1014: Decelerate fitting of the model into the embedding region in the to-be-processed frame in response to that the embedding region in the to-be-processed frame is occluded by the foreground, a weight of a sub-model in the model being unchanged.

Decelerating the fitting of the model into the embedding region in the to-be-processed frame includes reducing a rate at which the model is fitted into the embedding region in the to-be-processed frame. For example, for a model of each pixel in the embedding region, the weight of the sub-model in the model may be kept unchanged by setting a learning rate associated with a fitting speed in the model to 0. When the embedding region in the to-be-processed frame is occluded by the foreground, the fitting of the model into the embedding region in the to-be-processed frame is decelerated, so that a speed of learning a pixel change in the embedding region by the model decreases, so as to avoid subsequently misidentifying the foreground as the background.

Step S1015: Determine whether illumination of the embedding region in the to-be-processed frame changes.

In some embodiments, second color space distribution of the embedding region in the to-be-processed frame and second color space distribution of the embedding region in the reference frame may be acquired first. Then, a difference between the second color space distribution of the embedding region in the to-be-processed frame and the second color space distribution of the embedding region in the reference frame is determined, so as to determine, by determining whether the difference meets a second difference condition, whether the illumination of the embedding region in the to-be-processed frame changes. The second difference condition may be used for indicating the maximum difference between the second color space distribution of the embedding region in the reference frame and the second color space distribution of the embedding region in the to-be-processed frame when it is determined that the illumination of the embedding region in the to-be-processed frame changes.

For example, in response to that the second color space distribution of the embedding region in the to-be-processed frame and the second color space distribution of the embedding region in the reference frame meet the second difference condition, it is determined that the illumination of the embedding region in the to-be-processed frame changes, and step S1016 is performed. In response to that the second color space distribution of the embedding region in the to-be-processed frame and the second color space distribution of the embedding region in the reference frame do not meet the second difference condition, it is determined that the illumination of the embedding region in the to-be-processed frame does not change, the original learning rate is maintained, and the weight is updated.

In some embodiments, the second color space distribution may be hue saturation value (HSV) space distribution. For an implementation process of step S1015, reference may be made to step S1013.

Step S1016: Accelerate the fitting of the model into the embedding region in the to-be-processed frame.

Accelerating the fitting of the model into the embedding region in the to-be-processed frame includes increasing the rate at which the model is fitted into the embedding region in the to-be-processed frame. In some embodiments, a prerequisite for performing step S1016 is that the embedding region in the to-be-processed frame is not occluded by the foreground, and that the illumination of the embedding region in the to-be-processed frame changes. Therefore, to avoid identifying new illumination as the foreground, the fitting needs to be accelerated, so that the model is quickly fitted into the embedding region in the to-be-processed frame to ensure that the model can represent the pixel distribution characteristic of the embedding region. For example, for the model of each pixel in the embedding region, the learning rate associated with the fitting speed in the model may be set to −1.

The weight of each sub-model in the model is updated by performing step S1013 to step S1016. In this case, the parameter of the sub-model further needs to be updated.

Step S1017: Determine whether each pixel in the embedding region in the to-be-processed frame separately matches a sub-model in a corresponding model.

In some embodiments, for any pixel in the embedding region, if a deviation of a color value of the pixel from a mean of any sub-model in the model of the pixel is less than a specific threshold, the pixel is considered to match the sub-model. For example, in actual application, the threshold may be related to a standard deviation, and may be 2.5 times a standard deviation of the sub-model. If a pixel matches at least one sub-model in the model, step S1018 is performed. If a pixel does not match any sub-model in the model, step S1019 is performed.

Step S1018: Update, in response to that a pixel in the embedding region in the to-be-processed frame matches at least one sub-model in a corresponding model, a parameter of the matched sub-model.

For a sub-model, that does not match the pixel, in a corresponding model of the pixel, a parameter of the corresponding sub-model remains unchanged.

Step S1019: Initialize, when a pixel in the embedding region in the to-be-processed frame does not match any sub-model in a corresponding model, a new sub-model based on the pixel and replace a sub-model with the minimum weight.

Herein, the parameter of the sub-model is updated by performing step S1017 to step 1019. When the parameter of the sub-model is updated, occlusion detection needs to be performed on each pixel in the embedding region in the to-be-processed frame, that is, whether the pixel is a foreground or background pixel is determined. In addition, the parameter of the sub-model is updated and a template used for occluding the background and exposing the foreground is generated according to an occlusion detection result, so that when information is embedded into the embedding region in the to-be-processed frame, the information is better incorporated with the background, and the foreground is not occluded.

In some embodiments, step S102 may be implemented by using the following steps:

Step S1021: Match a color value of each pixel in the embedding region in the to-be-processed frame with each sub-model in a model corresponding to the pixel.

Herein, step S1021 may be implemented by the step comprising comparing the color value of each pixel in the embedding region in the to-be-processed frame with each sub-model corresponding to the pixel. When a deviation of a color value of a pixel from a mean of at least one sub-model falls within a specific threshold range, it indicates that the sub-model matches the pixel.

Step S1022: Identify a matched pixel as a pixel of the background, and identify a mismatched pixel as a pixel of the foreground.

Herein, because the embedding region in the reference frame is a region that does not occlude the foreground, the embedding region may be the background. The model is constructed based on the pixel distribution characteristic of the embedding region in the reference frame. Therefore, if a pixel in the embedding region in the to-be-processed frame matches a sub-model in a model corresponding to the pixel, the pixel is determined as a background pixel. If a pixel in the embedding region in the to-be-processed frame does not match any sub-model in a model corresponding to the pixel, it is determined that the pixel is a foreground pixel.

Step S1023: Fill, for a pixel that is in the embedding region in the to-be-processed frame and that is identified as a pixel of the background, a binary number one in a corresponding empty position in the template.

Step S1024: Fill, for a pixel that is in the embedding region in the to-be-processed frame and that is identified as a pixel of the foreground, a binary number zero in a corresponding position in the template filled with the binary number one.

A binary template is generated by performing step S1021 to step S1024. In the template, for a pixel identified as a background pixel, a template position corresponding to the pixel is 1, and for a pixel identified as a foreground pixel, a template position corresponding to the pixel is 0. Therefore, after a multiplication operation is performed on the template and to-be-embedded information, updated to-be-embedded information is obtained after the template is applied. A pixel value of a pixel identified as a foreground pixel in the updated to-be-embedded information is 0, and a pixel value of a pixel identified as a background pixel remains unchanged. In this way, when the embedding region in the to-be-processed frame is overlaid with the updated to-be-embedded information, it can be ensured that the foreground is not occluded, and is highlighted relative to the embedded information.

In some instances, before or after step S101, the embedding region in the to-be-processed frame further needs to be determined. If the video is formed by using a static shot, an image range and a field of view area in the video are unchangeable. In this case, in actual implementation, determining the embedding region in the to-be-processed frame may be positioning a region of a corresponding position in the to-be-processed frame based on the position of the embedding region in the reference frame, so as to obtain the embedding region in the to-be-processed frame.

In some embodiments, if the video is formed by using a motion shot, determining the embedding region in the to-be-processed frame may be implemented by performing the following steps:

Step 21: Match a feature extracted from the embedding region in the reference frame of the video with a feature extracted from the to-be-processed frame.

Herein, step 21 may be implemented by first extracting a feature point from the embedding region in the reference frame, extracting a feature point in the to-be-processed frame, and then matching the feature point extracted from the embedding region in the reference frame with the feature point in the to-be-processed frame.

Further, during feature point extraction, oriented features from accelerated segment test (FAST) and rotated binary robust independent elementary features (BRIEF) (ORB) or scale-invariant feature transform (SIFT) feature points may be extracted. Certainly, in some embodiments, other types of feature points may be extracted.

Step 22: Determine, in response to successful matching, that the to-be-processed frame includes an embedding region corresponding to the embedding region in the reference frame.

Herein, in this embodiment, that a feature point in the embedding region in the reference frame is successfully matched with a feature point in the to-be-processed frame may be that all feature points are successfully matched, or may be that some feature points are successfully matched, for example, 80% of feature points are successfully matched.

In response to successful matching between a feature point in the embedding region in the reference frame and a feature point in the to-be-processed frame, it indicates that an embedding region corresponding to the embedding region in the reference frame exists in the to-be-processed frame. In this case, the information can be embedded. In response to unsuccessful matching between a feature point in the embedding region in the reference frame and a feature point in the to-be-processed frame, it indicates that no embedding region corresponding to the embedding region in the reference frame exists in the to-be-processed frame. In this case, if information is embedded, a large area of the foreground in the to-be-processed frame may be occluded, and therefore information implantation cannot be performed in this case.

In step 21 and step 22, a feature point in the embedding region in the reference frame is matched with a feature point in the to-be-processed frame to track the embedding region in the to-be-processed frame. This manner is applicable to a wider range and more robust, and has higher automation efficiency, compared with an implementation of motion tracking.

In some embodiments, if the video is formed by using a motion shot, a position of an embedding region in each image frame of the video formed by using the motion shot may change because a position, an optical axis, and a focal length of the lens may change. In this case, before step S1013, the following step needs to be further performed:

Step 31: Transform the embedding region in the to-be-processed frame, so that a position of each pixel in the transformed embedding region is consistent with a position of a corresponding pixel in the embedding region in the reference frame.

Herein, step 31 may be implemented by first tracking the embedding region (that is, a background region used for information implantation) to generate a homography matrix H, and then transforming the embedding region in the to-be-processed frame to the reference frame according to the homography matrix H, so that a position of each pixel in the transformed embedding region is consistent with a position of a corresponding pixel in the embedding region in the reference frame. Further, this may be implemented according to formula (2-1):

$$\begin{bmatrix} x_0 \\ y_0 \\ 1 \end{bmatrix} = H^{-1} \begin{bmatrix} x_t \\ y_t \\ 1 \end{bmatrix} = \begin{bmatrix} h00 & h01 & h02 \\ h10 & h11 & h12 \\ h20 & h21 & h22 \end{bmatrix}^{-1} \begin{bmatrix} x_t \\ y_t \\ 1 \end{bmatrix}; \quad (2\text{-}1)$$

where $(x_t, y_t)$ indicates a pixel in a current frame, and $(x_0, y_0)$ indicates a pixel, in the reference frame, corresponding to the pixel.

If the video is formed by using a motion shot, because the embedding region transformed by using the homography matrix is actually used when update of the model is controlled based on the embedding region in the to-be-processed frame, in step S102, the background and the foreground of the embedding region in the to-be-processed frame are identified and the template used for occluding the background and exposing the foreground is generated by using the embedding region transformed by using the homography matrix. Correspondingly, before step S103, inverse transform of the transform needs to be further performed on the template, so that a position of each binary number in the transformed template is consistent with a position of a corresponding pixel in the embedding region in the to-be-processed frame.

In this embodiment of this disclosure, for a video formed by using a static shot, a pixel distribution characteristic of each pixel in an embedding region in a to-be-processed frame is used for fitting background pixel distribution of an embedding region in a reference frame, Gaussian mixture modeling is used for automatically learning and updating the model, and a template that can occlude a background and display a foreground is determined according to an occlusion detection result, so as to prevent embedded information from occluding the foreground. For a motion shot, a transform technology is used for mapping a pixel position in an embedding region in a to-be-processed frame to a consistent position in an embedding region in a reference frame. Similarly, occlusion detection is performed on a pixel in the embedding region in the to-be-processed frame, and a template is generated. Then, the template is inversely transformed to form a template that can occlude a background and display a foreground, so as to ensure that the foreground is not occluded after information is embedded.

Figure 5:
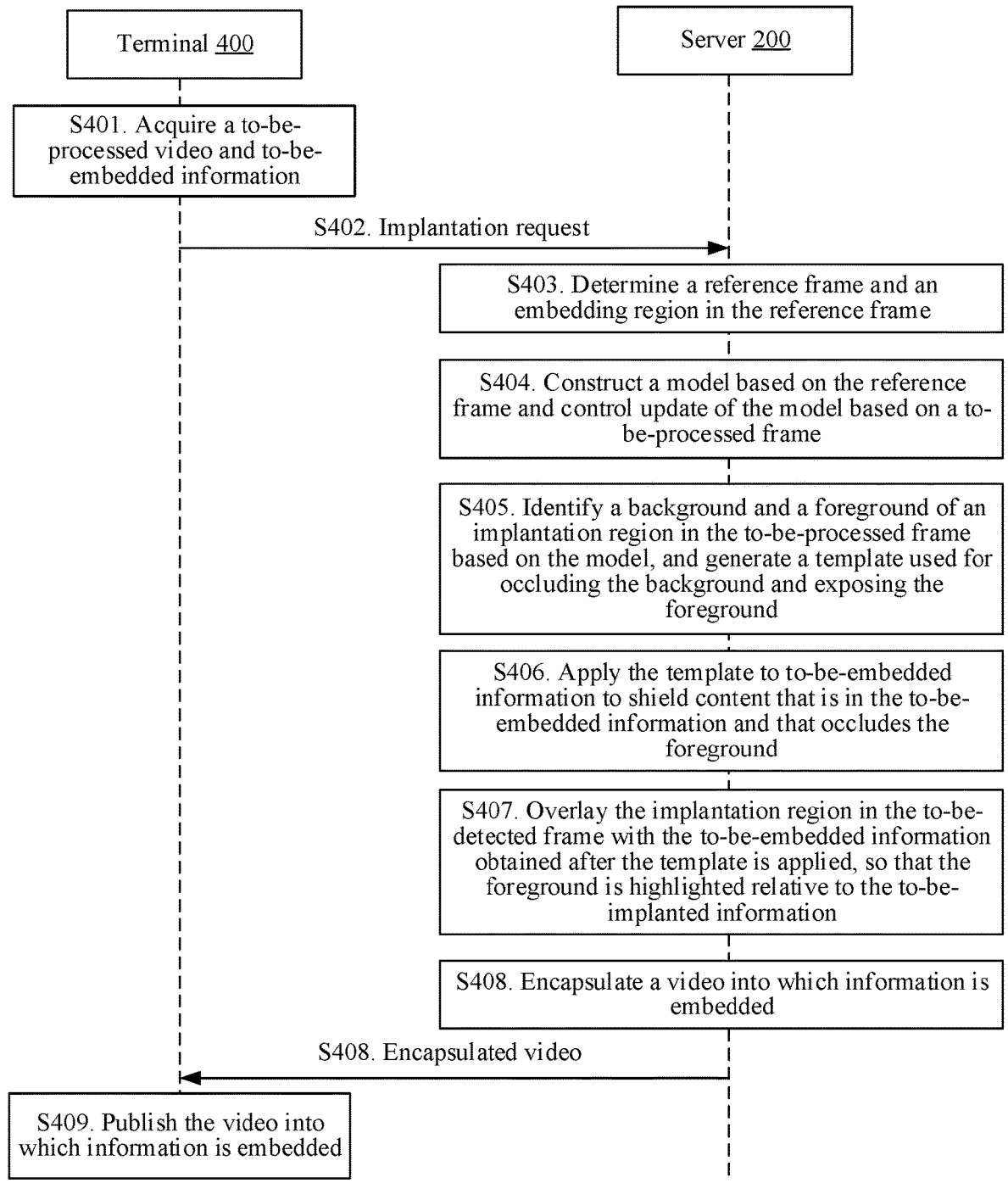
FIG. 5 is a schematic flowchart of another implementation of a method for embedding information into a video according to an embodiment of this disclosure.

An embodiment of this disclosure further provides a method for embedding information into a video. FIG. 5 is a schematic flowchart of still another implementation of a method for embedding information into a video according to an embodiment of this disclosure. As shown in FIG. 5, the method includes the following steps:

Step S401: A terminal acquires a to-be-processed video and to-be-embedded information.

Herein, the to-be-processed video may be a video recorded by the terminal, or may be a video downloaded by the terminal from a server, or certainly, may be a video transmitted by another terminal to the terminal. The to-be-embedded information may be to-be-embedded picture information, and the to-be-embedded picture information may be advertisement picture information, publicity information, or the like.

In this embodiment of this disclosure, the to-be-processed video may be a video file that includes a plurality of image frames. In some embodiments, the to-be-processed video may alternatively refer to identification information of the to-be-processed video, for example, the to-be-processed video may include information such as a title and a leading role of the to-be-processed video.

Step S402: The terminal transmits, to a server, an implantation request that carries at least the video and the to-be-embedded information.

In some embodiments, the implantation request may further include an identifier of a reference frame and information about an embedding region in the reference frame.

In an example in which the embedding region is a rectangle, the implantation request may include a frame number of a reference frame and coordinates of four vertices of an embedding region in the reference frame.

Step S403: The server determines a reference frame and an embedding region in the reference frame based on the received implantation request.

In some embodiments, the received implantation request may be parsed to acquire a specified reference frame and an embedding region specified in the reference frame. In some other embodiments, an image frame of a video file may be analyzed in an image identification manner to determine a reference frame and an embedding region in the reference frame that meet an information implantation condition.

As an example of the information implantation condition, at least one of the following may be included: A type of the embedding region (e.g., a wall and the ground), a size of the embedding region (e.g., a width and a height, to adapt to to-be-embedded information), a color of the embedding region (e.g., to form a contrast with to-be-embedded information), and an exposure time of the embedding region (i.e., cumulative duration of appearance in a video).

Step S404: The server constructs a model that conforms to a pixel distribution characteristic of the embedding region in the reference frame, and controls update of the model based on a subsequent to-be-processed frame of the reference frame.

Step S405: The server identifies a background and a foreground of an embedding region in the to-be-processed frame based on the model and generates a template used for occluding the background and exposing the foreground.

Step S406: The server applies the template to to-be-embedded information to obtain an updated to-be-embedded information and to shield content that is in the to-be-embedded information and that occludes the foreground.

Step S407: Overlay the embedding region in the to-be-processed frame with the updated to-be-embedded information, so that the foreground is highlighted relative to the to-be-embedded information.

Herein, for an implementation process of step S404 to step S407, reference may be made to descriptions of the foregoing similar steps.

Step S408: The server encapsulates a video into which information is embedded, and transmits the encapsulated video to the terminal.

In some embodiments, before embedding information into each image frame in the video, the server first performs framing on the video to obtain individual image frames, and then implants information into each image frame. Therefore, after the information is embedded, in order to obtain a normal video file, each image frame, audio, caption, and the like need to be centralized, so that the audio, image frame, and caption are integrated.

In some embodiments, after encapsulating the video into which information is embedded, the server may further publish the video into which information is embedded in a video watching APP.

Step S409: The terminal publishes the video into which information is embedded.

In some embodiments, the video into which information is embedded may be published in the video watching APP, or may be transmitted to another terminal, for example, may be published in a group chat of an instant messaging APP.

In the method provided in this embodiment of this disclosure, when a terminal needs to implant information into a video, the terminal transmits a to-be-processed video and to-be-embedded information to a server, and the server constructs a model according to a pixel distribution characteristic of an embedding region in a reference frame. Because the embedding region in the reference frame does not occlude a foreground of the video, background and foreground identification may be performed on pixels in an embedding region in a subsequent to-be-processed frame based on the constructed model, and further a template that can occlude the background but does not occlude the foreground is generated. After the template is applied to the to-be-embedded information, content that is in the to-be-embedded information and that occludes the foreground can be shielded, so that after the information is embedded into the to-be-processed frame, the foreground part in the to-be-processed frame is not occluded, thereby ensuring video viewing experience.

The following describes an exemplary application of this embodiment of this disclosure in an actual application scenario.

Figure 6:
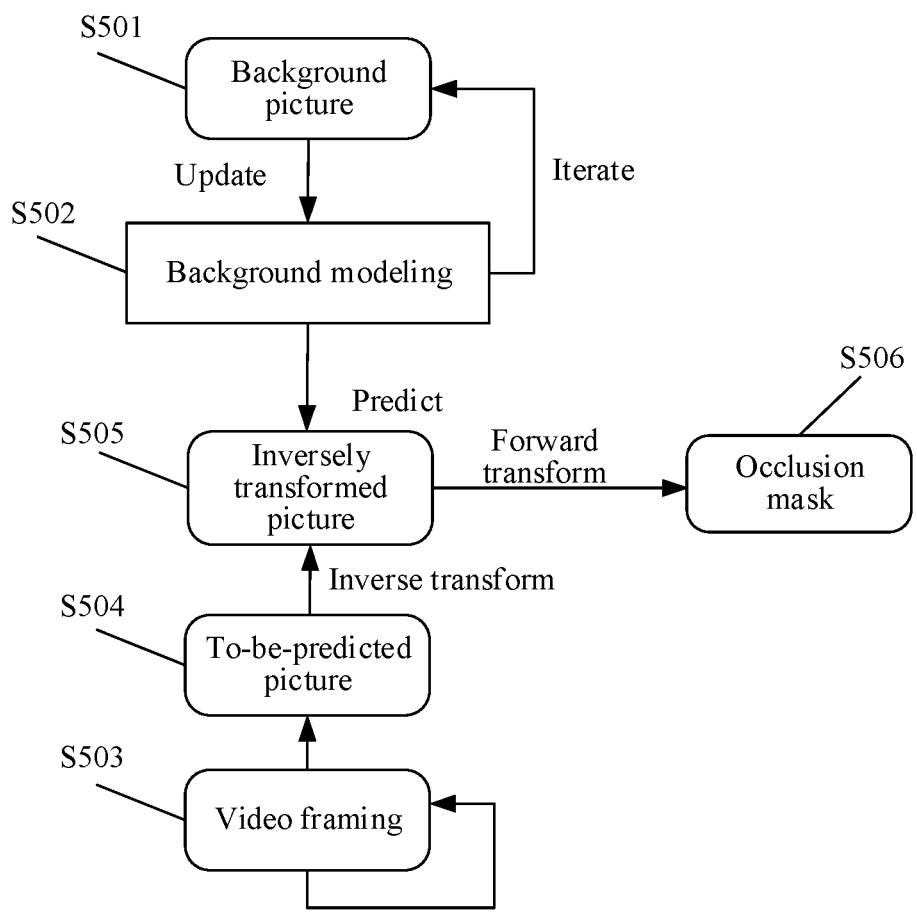
FIG. 6 is a schematic flowchart of still another implementation of a method for embedding information into a video according to an embodiment of this disclosure.

An embodiment of this disclosure further provides a method for embedding information into a video. In an implementation process, the method includes two stages: a background modeling learning stage and an occlusion prediction stage. FIG. 6 is a schematic flowchart of still another implementation of a method for embedding information into a video according to an embodiment of this disclosure. As shown in FIG. 6, the method includes the following steps:

Step S501: Acquire a background picture.

Step S502: Perform Gaussian mixture modeling according to the background picture.

A background modeling process is completed by performing step S501 and step S502.

Step S503: Perform framing on the video.

Step S504: Acquire a to-be-predicted picture.

Step S505: Inversely transform the to-be-predicted picture based on the background modeling to obtain an inversely transformed picture.

Step S506: Perform forward transform on the inversely transformed picture to obtain an occlusion mask.

As shown in the flowchart in FIG. 6, an adaptive GMM is constructed for background modeling. Based on an initial frame of interests embedded into a video advertisement, background modeling is performed on an adaptively selected frame picture for a subsequent frame, and a learning rate is adaptively selected for iterative update to optimize the mode.

Figure 7:
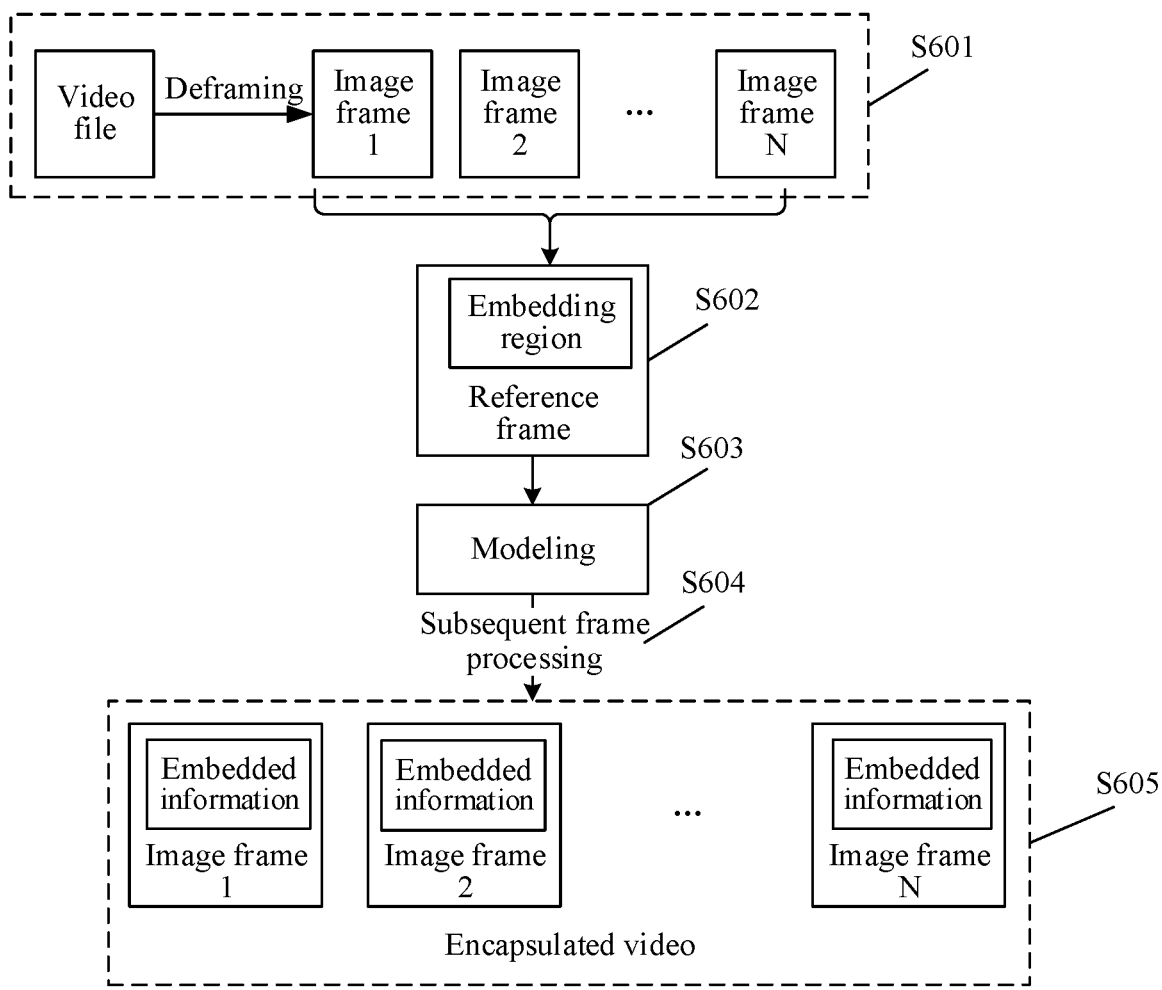
FIG. 7 is a schematic diagram of still another implementation process of embedding information into a video according to an embodiment of this disclosure.

FIG. 7 is a schematic diagram of still another implementation process of embedding information into a video according to an embodiment of this disclosure. As shown in FIG. 7, in this embodiment, the following steps may be used for embedding information into a video:

Step S601: Deframe a video.

Herein, a deframing operation is performed on an inputted video by using an image processing technology, and the video is split such that each frame is used as a to-be-predicted picture.

Step S602: Position an initial frame of interests (that is, a frame into which an advertisement is to be embedded) and a corresponding embedding region.

Herein, the initial frame of interests and the corresponding embedding region may be manually set. In some embodiments, alternatively, a frame including a specific object/region (e.g., the ground and a wall) in the video may be automatically identified as the initial frame of interests, and further, the initial frame of interests, the embedding region, and a specific position (e.g., an intermediate region, consistent with an advertisement size) may be determined by using an image identification technology based on a neural network, where the specific position corresponds to a corresponding embedding region.

Step S603: Initialize, according to an image of the embedding region in the initial frame of interests, a GMM corresponding to each pixel in the embedding region.

Step S604: Process a subsequent frame (that is, a frame that includes an embedding region and that is subsequently included in the video) as follows:

Step S6041: Compare an embedding region in the subsequent frame with the embedding region in the initial frame in terms of distribution characteristic to determine whether an occlusion occurs; and update a learning rate when an occlusion occurs.

Step S6042: Adjust the learning rate depending on whether an illumination change occurs.

Step S6043: Identify a background/foreground pixel, update the model with reference to an identification result and the updated learning rate, and further determine a mask.

In actual implementation, foreground/background identification may be first performed, that is, whether a pixel meets at least one mode in a corresponding model is determined; if the pixel meets at least one mode, the pixel is a background pixel; and if the pixel does not meet any mode, the pixel is a foreground pixel. The model is then updated, involving update of a weight and parameters (a mean and a standard deviation) of the mode.

The weight of the mode is updated according to the updated learning rate; and in terms of parameters, a mean and a standard deviation of a mode that does not match the pixel remain unchanged, and a mean and a standard deviation of a matched mode are updated according to the updated learning rate and weight. If no mode is matched, a mode with the smallest weight is replaced. The modes are sorted in descending order of $\omega/\alpha^2$. A mode with a large weight and a small standard deviation is sorted in the front. Herein, $\omega$ indicates the weight, and $\alpha$ indicates the learning rate.

Step S6044: Implant to-be-embedded information obtained after the mask is applied into the embedding region in the subsequent frame.

For an implementation process of step S6044, reference may be made to descriptions of the foregoing similar step.

Step S605: Repeat step S604, and after all subsequent frames are processed, encapsulate the image frames.

Herein, when an encapsulated video is played back, the embedded advertisement does not occlude a foreground part of the image frame, thereby bringing better viewing experience.

In the foregoing steps, step S601 to step S603 correspond to the background modeling learning part, and step S604 and step S605 correspond to the occlusion prediction part. The two parts are cross-executed: First, the model is constructed according to the initial frame; and then occlusion prediction (determining) is performed on the subsequent frame, and the model continues to be updated according to the prediction result.

In some embodiments, step S603 may be implemented by acquiring a reference frame (i.e., an initial frame of interests that includes an embedding region) of a video advertisement implantation item as background modeling to initialize a GMM of a priori embedding region (a specific region used for advertisement implantation in a background region of a reference frame of a video is an embedding region).

The embedding region in the initial frame of interests meets the following condition: The embedding region in the initial frame of interests is not occluded by the foreground. Therefore, when the model is initialized, pixel distribution in the embedding region can be completely learned.

A GMM of each pixel in the embedding region is established. In the GMM, a color value of a pixel is represented by superimposing K modes (in some embodiments, the mode may also be referred to as a Gaussian mode/Gaussian component/sub-model), and K is generally between 3 and 5. In the GMM, a color value X presented by a pixel is represented as a random variable, and a color value of a pixel in each frame of image of the video is a sampling value of the random variable X.

In Gaussian background maintenance, a color value of each pixel in a scenario may be represented by mixed distribution of K Gaussian components, that is, the probability that a value of a pixel j in an image is $x_j$ at a moment t is:

$$p(x_j) = \sum_{i=1}^{K} \omega_{j,t}^i \cdot \eta\left(x_j, \mu_{j,t}^i, \sum_{j,t}^i\right); \qquad (3\text{-}1)$$

where $\omega_{j,t}^i$ indicates a weight of an $i^{th}$ Gaussian component in a GMM of the pixel j at the moment t, and meets:

$$\sum_{i=1}^{K} \omega_{j,t+1}^i = 1.$$

Herein, $\mu_{j,t}^i$ and $\Sigma_{j,t}^i$ respectively indicate a mean and a covariance of the $i^{th}$ Gaussian component, and $\eta$ indicates a Gaussian probability density function:

$$\eta\left(x_j, \mu_{j,t}^i, \sum_{j,t}^i\right) = \qquad (3\text{-}2)$$

$$\frac{1}{(2\pi)^{d/2}|\Sigma_{j,t}^i|^{1/2}} \exp\left[-\frac{1}{2}(x_j - \mu_{j,t}^i)^T (\Sigma_{j,t}^i)^{-1}(x_j - \mu_{j,t}^i)\right];$$

where d is the number of dimensions of $x_j$, which can be considered mutually independent for an RGB color space, and a covariance matrix is defined as:

$$\Sigma_{j,t}^i = (\sigma_{j,t}^i)^2 I \qquad (3\text{-}3);$$

where $\sigma$ indicates a standard deviation, and I indicates a unit matrix.

Initializing the GMM may be initializing each parameter. In this embodiment of this disclosure, there may be the following two initialization manners:

Initialization manner 1: In an initialization stage, if a high initialization speed is not required for the GMM parameter, a range of each color channel of a pixel is [0, 255], a relatively large $\sigma_{init}^2$ may be directly initialized for K Gaussian components; a weight of each Gaussian component is $\omega_{init}=1/K$; a mean of the K Gaussian components in the GMM is initialized by using a color value of each pixel in the first frame of image. The mean is a color value of a pixel, and the variance is a preset empirical value.

Initialization manner 2: In the first frame of image, the first Gaussian component corresponding to each pixel is initialized; a mean is assigned a color value of a current pixel; a weight is assigned 1; a mean and a weight of another Gaussian component than the first Gaussian component are initialized to zero. The variance is a preset empirical value.

In some embodiments, during processing of the subsequent frame, different processing is performed depending on a lens type used for forming a video.

For a video formed by using a static shot, step S6041 may be implemented as follows:

For an embedding region in each subsequent frame of an initial frame of interests, RGB color space distribution of an embedding region in a subsequent frame is compared with that of an initial embedding region (that is, an embedding region in an initial frame), and whether an occlusion exists is determined according to a difference between the RGB distributions. That is, whether an advertisement embedded into the embedding region in the initial frame of interests occludes a foreground that appears in the embedding region in the subsequent frame is determined, for example, whether occludes "Child's Pose" in FIG. 8B. If the difference between the RGB distributions meets a difference condition, it is considered that the background of the embedding region is occluded by the foreground. Determining whether the difference between the RGB distributions meets the difference condition may be implemented by comparing histogram distribution. For example, grayscales 0-255 may be divided into 16 intervals, and distribution of pixels of each frame within the 16 intervals is counted and compared. If a difference between the histogram distribution of the embedding region in the subsequent frame and the histogram distribution of the initial embedding region exceeds a specific threshold, it indicates that the difference between the RGB distributions meets the difference condition. In this case, it is considered that the background of the embedding region in the subsequent frame is occluded by the foreground. Correspondingly, if the difference between the histogram distribution of the embedding region in the subsequent frame and the histogram distribution of the initial embedding region does not exceed the threshold, it indicates that the difference between the RGB distributions does not meet the difference condition. In this case, it is considered that the background of the embedding region in the subsequent frame is not occluded by the foreground.

When it is determined that an occlusion exists, the updated learning rate is set to 0 (that is, a weight of a mode in the model is not to be updated by using the subsequent frame); if no occlusion exists, the original learning rate can be maintained.

In some embodiments, step S6042 may be implemented as follows:

For an embedding region in each subsequent frame of an initial frame of interests, HSV distribution of an embedding region in a subsequent frame is compared with that of an initial embedding region (that is, the embedding region in the initial frame), and whether illumination of the background changes is determined according to a difference between the HSV distributions. Determining whether the difference between the HSV distributions meets a difference condition may be implemented by comparing histogram distribution of HSV color spaces. If the difference condition is met, it is considered that the illumination of the background changes, and the updated learning rate is set to −1. Because HSV can reflect an illumination change, if the illumination of the background changes, the learning rate may be adjusted to −1 to increase a weight of a mode that meets the new illumination change, so as to avoid a case that the new illumination is identified as the foreground. If no illumination change occurs, the original learning rate may be maintained.

In some embodiments, step S6043 may be implemented by identifying a pixel type of the embedding region in the subsequent frame and updating the model to further determine the mask.

For the same pixel of the initial frame of interests and the subsequent frame, color value $X_t$ of the subsequent frame (at the moment t) is compared with current K modes (that is, K Gaussian components) of the pixel; if a deviation from a mean of at least one mode falls within $2.5\sigma$ (that is, 2.5 times a standard deviation), it is considered that the mode matches the pixel, and the pixel belongs to the background. If matching fails, the pixel belongs to the foreground.

After a pixel is determined as a foreground pixel or a background pixel, a mask is determined and improved by using morphology.

If a pixel belongs to the background of the video, a value corresponding to the pixel in the mask is 1; otherwise, if the pixel belongs to the foreground of the video, the value corresponding to the pixel in the mask is 0.

Figure 9A:
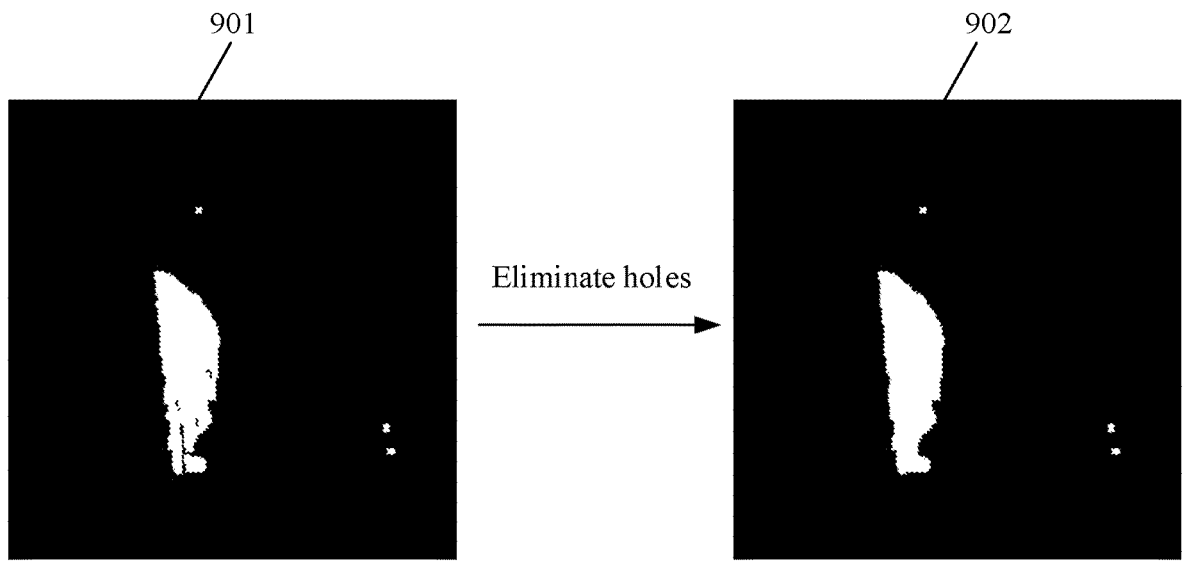
FIG. 9A is a schematic diagram of improving a mask by using morphology according to an embodiment of this disclosure.
Figure 9B:
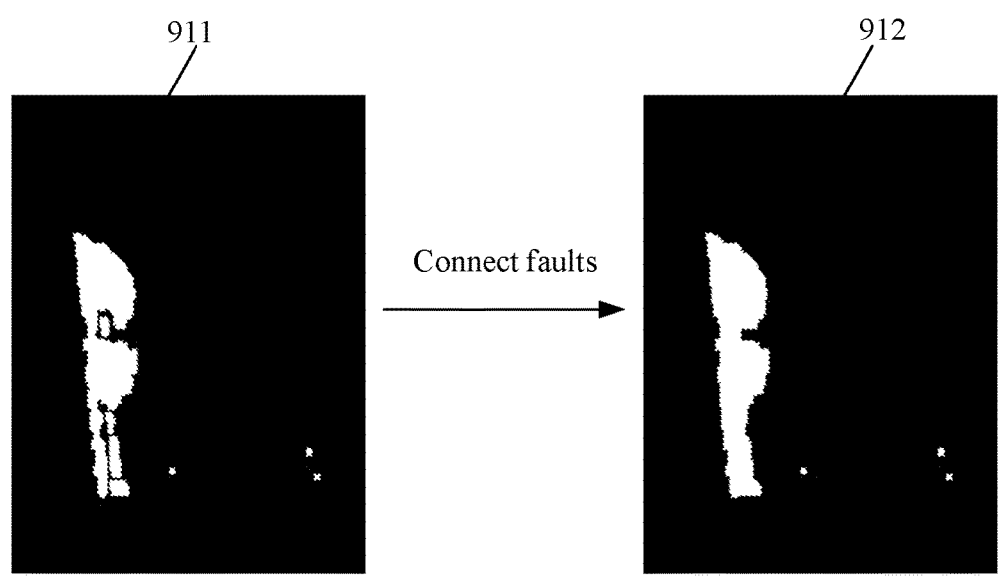
FIG. 9B is another schematic diagram of improving a mask by using morphology according to an embodiment of this disclosure.

In this embodiment of this disclosure, when the mask is improved by using morphology, some errors of the mode in determining the foreground and the occlusion are mainly repaired, including eliminating holes and connecting faults in the mask, and avoiding noise in the exposed video foreground after occlusion processing. FIG. 9A and FIG. 9B are schematic diagrams of improving a mask by using morphology. As shown in FIG. 9A, holes in a white region in 901 may be eliminated by using morphology to form a fully connected region shown in 902. As shown in FIG. 9B, faults in 911 may be connected by using morphology to also form a connected complete region shown in 912.

Updating the model may be updating the weight of the model according to the updated learning rate. A mean and a standard deviation of a mode that does not match a pixel are unchanged, and only a mean and a standard deviation of a matched mode are updated. If no mode matches a pixel, a new mode is initialized based on the pixel, and a mode with the minimum weight is replaced. The modes are sorted in descending order of $\omega/\alpha^2$. A mode with a large weight and a small standard deviation is sorted in the front. Herein, $\omega$ indicates the weight, and $\alpha$ indicates the learning rate.

In actual implementation, if $x_j$ matches an $i^{th}$ mode, the $i^{th}$ mode is updated by $x_j$, and the reaming mode remains unchanged. The update manner is as follows:

$$\omega^i_{j,t+1} = (1-\alpha)\omega^i_{j,t} + \alpha; \tag{3-4}$$

$$\mu^i_{j,t+1} = (1-\rho)\mu^i_{j,t} + \rho x_j; \tag{3-5}$$

$$(\sigma^i_{j,t+1})^2 = (1-\rho)(\sigma^i_{j,t})^2 + \rho(x_j - \mu^i_{j,t})^T(x_j - \mu^i_{j,t}); \tag{3-6}$$

$$\rho = \frac{\alpha}{\omega^i_{j,t}}; \tag{3-7}$$

where $\alpha$ is the learning rate of the model, and $\rho$ is a learning rate of a parameter, reflecting a convergence rate of the mode parameter. If $x_j$ matches none of K modes of a pixel, the several modes sorted at the end in the GMM are to be replaced with a new mode. A mean of the new mode is $x_j$, and a standard deviation and a weight thereof are initialized to $\sigma_{init}$ and $\omega_{init}$. The remaining mode keeps the same mean and variance, and the weight is updated according to formula (3-8):

$$\omega_{j,t+1}{}^i = (1-\alpha)\omega_{j,t}{}^i \tag{3-8};$$

After the update is complete, weights of the modes need to be normalized. After the parameter update is complete, to determine that a mode in the GMM of a pixel is generated by the background, the first B modes are selected as background distribution in descending order of $\omega/\alpha^2$ of the modes, where B satisfies the following formula, and parameter Q indicates a proportion of the background:

$$B = \arg\left(\left(\min\left(\sum_{k=1}^{b}\omega_k > Q\right)\right)\right); \tag{3-9}$$

A larger value indicates that a pixel value has a larger variance and a higher occurrence probability, which represents a characteristic of a background pixel value of a scenario.

Figure 8A:
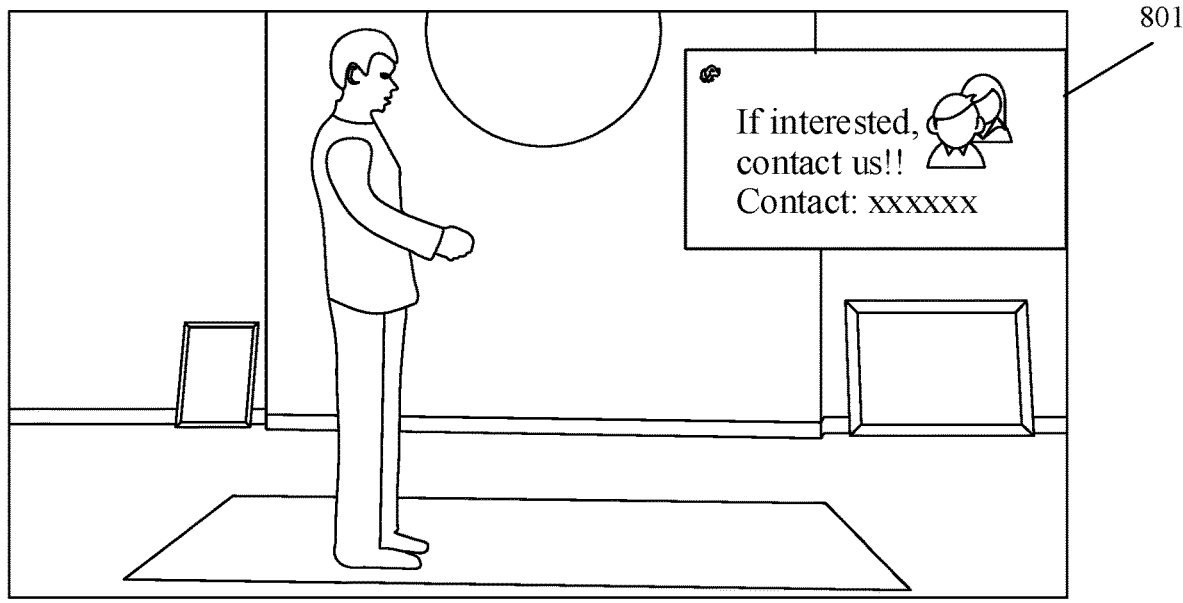
FIG. 8A is a schematic diagram of an effect of embedding information into a video formed by using a static shot according to an embodiment of this disclosure.
Figure 8B:
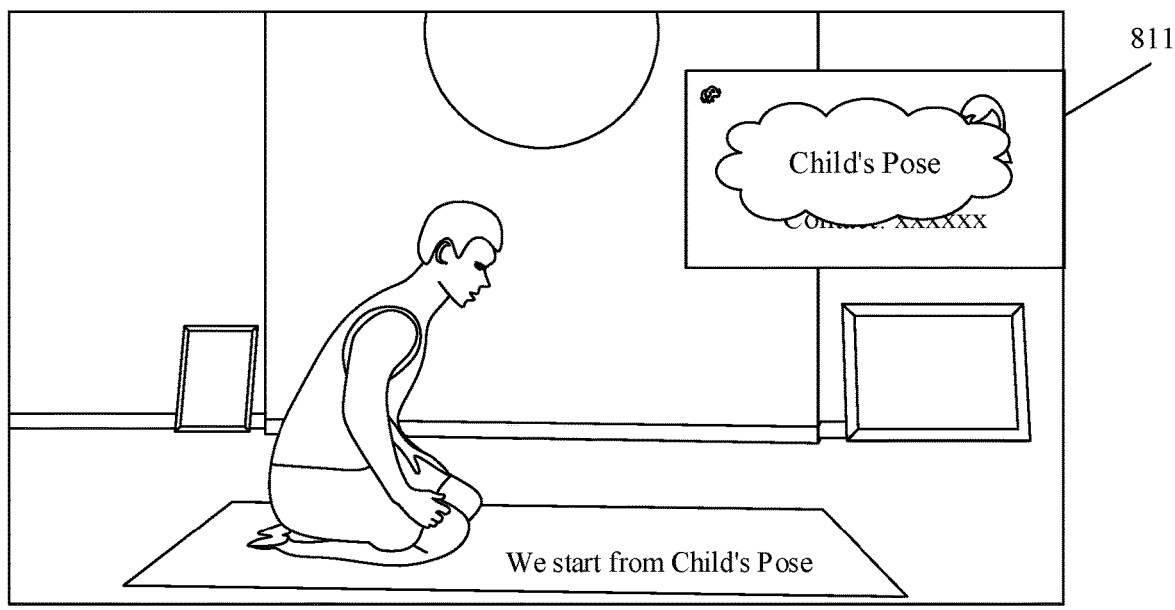
FIG. 8B is a schematic diagram of another effect of embedding information into a video formed by using a static shot according to an embodiment of this disclosure.

The foregoing may be considered as an implementation process of embedding information into a video formed by using a static shot. FIG. 8A and FIG. 8B are schematic diagrams of effects of embedding information into a video formed by using a static shot according to an embodiment of this disclosure. An image shown in FIG. 8A may be a frame of image (that is, a frame of image before "Child's Pose" is described in the video) before an image shown in FIG. 8B. In this case, as shown in FIG. 8A, a wall region 801 in the image frame does not display "Child's Pose". If the wall region is used as an advertisement embedding region, a foreground "Child's Pose" appears in a subsequent frame, that is, the image frame shown in FIG. 8B. If the embedded advertisement is directly used as an image layer for overlaying, the "Child's Pose" part is occluded.

After the solution for embedding information into a video provided in this embodiment of this disclosure is applied, as shown in FIG. 8B, the two words "Child's Pose" float on the advertisement, that is, the embedded advertisement 811 does not occlude the foreground content of the video, thereby ensuring integrity of the foreground content of the original video in an advertisement implantation position.

For a video formed by using a motion shot, in implementation of step S604, before step S6041, the following step further needs to be performed:

Step 71: Track a subsequent frame including an embedding region.

Template matching (a template of a feature point, such as a feature point found using an ORB method) is performed by using feature tracking techniques, or a sift method is used for tracking a subsequent frame including an embedding region.

For the subsequent frame of the video, the embedding region (that is, a background region used for information implantation) needs to be tracked first to generate a homography matrix H. Because background modeling is to model for each pixel, positions of pixels of the embedding region in the initial frame of interests (the reference frame) and positions of pixels of the embedding region in the subsequent frame needs to be in a one-to-one correspondence. If the camera moves, the positions of the pixels of the embedding region in the initial frame of interests and positions of pixels of an embedding region in a current frame do not correspond to each other.

During implementation of enabling the positions of the pixels of the embedding region in the initial frame of interests and the positions of the pixels of the embedding region in the subsequent frame to be in a one-to-one correspondence, the embedding region in the current frame may be inversely transformed to the initial frame according to the homography matrix H by using formula (3-10):

$$\begin{bmatrix} x_0 \\ y_0 \\ 1 \end{bmatrix} = H^{-1} \begin{bmatrix} x_t \\ y_t \\ 1 \end{bmatrix} = \begin{bmatrix} h00 & h01 & h02 \\ h10 & h11 & h12 \\ h20 & h21 & h22 \end{bmatrix}^{-1} \begin{bmatrix} x_t \\ y_t \\ 1 \end{bmatrix}; \quad (3-10)$$

where $(x_t, y_t)$ indicates a pixel in the current frame, and $(x_0, y_0)$ indicates a pixel, in the initial frame of interests, corresponding to the pixel.

For a video formed by using a motion shot, an implementation process of step S6041 and step S6042 is similar to an implementation process of step S6041 and step S6042 for a video formed by using a static shot. For details, refer to descriptions of the foregoing similar steps.

In implementation of step S6043, a pixel type of the embedding region in the subsequent frame is identified to update the model and determine the mask. Differently, after the mask is determined, the mask is inversely transformed into a position of the subsequent frame by using the homography matrix H, and the change is shown in the following formula (3-11):

$$\begin{bmatrix} x_t \\ y_t \\ 1 \end{bmatrix} = H \begin{bmatrix} x_0 \\ y_0 \\ 1 \end{bmatrix} = \begin{bmatrix} h00 & h01 & h02 \\ h10 & h11 & h12 \\ h20 & h21 & h22 \end{bmatrix} \begin{bmatrix} x_0 \\ y_0 \\ 1 \end{bmatrix}; \quad (3-11)$$

An advertisement is embedded into the embedding region in the subsequent frame, a corresponding mask is applied to an embedding region in an image frame in which existence of an occlusion is determined, and the video is encapsulated.

Figure 8C:
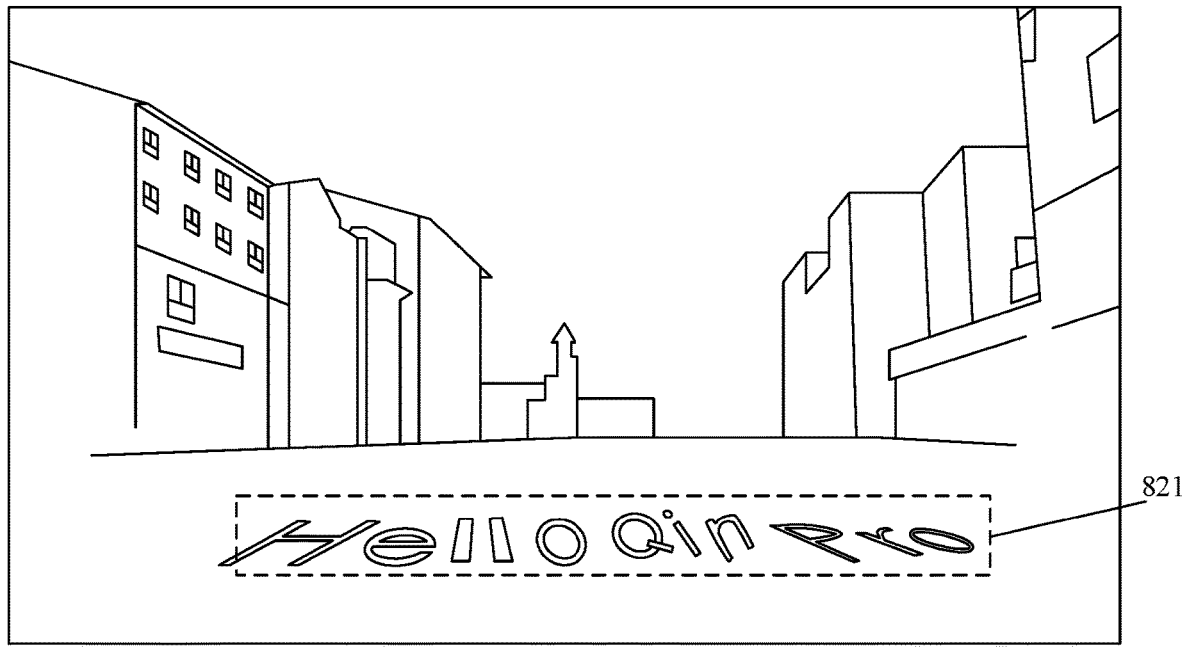
FIG. 8C is a schematic diagram of an effect of embedding information into a video formed by using a motion shot according to an embodiment of this disclosure.
Figure 8D:
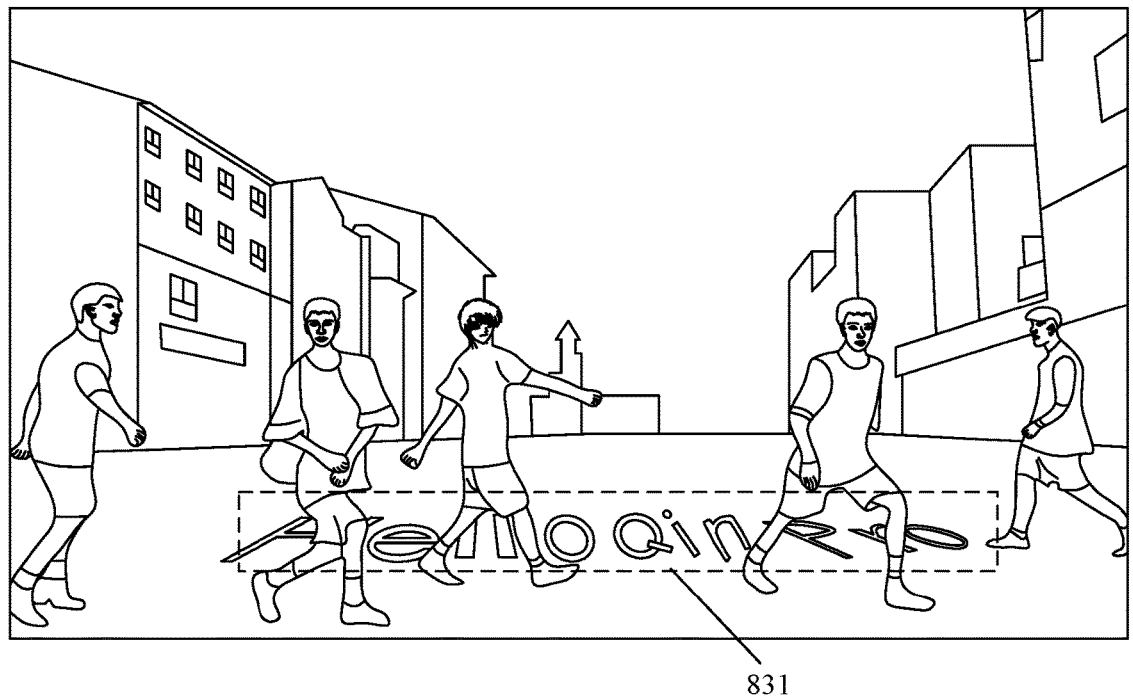
FIG. 8D is a schematic diagram of another effect of embedding information into a video formed by using a motion shot according to an embodiment of this disclosure.

FIG. 8C and FIG. 8D are schematic diagrams of effects of embedding information into a video formed by using a motion shot according to an embodiment of this disclosure. FIG. 8C is a frame in which persons do not appear. If the ground is used as an advertisement embedding region 821 in this case, an image frame after advertisement implantation is shown in FIG. 8C. In a subsequent frame, if an embedded advertisement "Hello Qin Pro" is directly used as an image layer for overlaying, legs of persons appearing in the region are occluded. After the solution for embedding information into a video provided in this embodiment is applied, as shown in FIG. 8D, the legs of the persons are displayed on the top of the embedded advertisement, so that the advertisement embedding region 831 does not occlude the foreground of the video.

According to the method for embedding information into a video according to this embodiment of this disclosure, with reference to a modeling method based on a video sequence and full-pixel statistics, background modeling is automatically selected for a static shot, a learning rate is automatically updated for a subsequent frame to optimize a model, and a statistical feature is used for determining an occlusion mask. For a motion shot, a transform technology is used for mapping an image to a standard image for pixel statistics modeling, and then a sequence frame is returned to obtain an occlusion mask, so that no motion tracking model is required. Therefore, an occlusion in a video advertisement implantation process can be processed at a very fine granularity, and performance of an embedded advertisement is more native. Therefore, real-time performance is high, a range of application is wide, robustness is strong, and automation efficiency is high.

The following describes exemplary structures of software modules. In some embodiments, as shown in FIG. 2, software modules in an apparatus 240 may include:

a model construction module 241, configured to construct a model that conforms to a pixel distribution characteristic of an embedding region in a reference frame, and control update of the model based on a subsequent to-be-processed frame of the reference frame;

a template generation module 242, configured to: identify a background and a foreground of an embedding region in the to-be-processed frame based on the model, and generate a template used for occluding the background and exposing the foreground;

a template application module 243, configured to apply the template to to-be-embedded information to shield content that is in the to-be-embedded information and that occludes the foreground; and an information overlaying module 244, configured to overlay the embedding region in the to-be-processed frame with the updated to-be-embedded information, so that the foreground is highlighted relative to the to-be-embedded information.

In some embodiments, the apparatus further includes:

a parameter initialization module, configured to initialize, for each pixel in the embedding region in the reference frame, at least one sub-model corresponding to the pixel and a weight corresponding to the at least one sub-model; and a weight mixing module, configured to mix, based on the initialized weight, the at least one sub-model constructed for each pixel to form a model corresponding to the pixel.

a weight maintaining module, configured to: reduce, in response to that the embedding region in the to-be-processed frame is occluded by the foreground, a rate at which the model is fitted into the embedding region in the to-be-processed frame, the weight of the sub-model in the model being unchanged; and a fitting acceleration module, configured to: increase, in response to that the embedding region in the to-be-processed frame is not occluded by the foreground and illumination of the embedding region in the to-be-processed frame changes, a rate at which the model is fitted into the embedding region in the to-be-processed frame.

In some embodiments, the apparatus further includes:

a parameter update module, configured to update, in response to that a pixel in the embedding region in the to-be-processed frame matches at least one sub-model in a corresponding model, a parameter of the matched sub-model and keep a parameter of a sub-model, that does not match the pixel, in the corresponding model unchanged.

In some embodiments, the apparatus further includes:

a first matching module, configured to match a color value of each pixel in the embedding region in the to-be-processed frame with a sub-model in a model corresponding to the pixel; and an identification module, configured to: identify a matched pixel as a pixel of the background, and identify a mismatched pixel as a pixel of the foreground.

In some embodiments, the apparatus further includes:

a filling module, configured to: fill, for a pixel that is in the embedding region in the to-be-processed frame and that is identified as a pixel of the background, a binary number one in a corresponding empty position in the template; and fill, for a pixel that is in the embedding region in the to-be-processed frame and that is identified as a pixel of the foreground, a binary number zero in a corresponding position in the template filled with the binary number one.

In some embodiments, the apparatus further includes:

an operation module, configured to perform a multiplication operation on the to-be-embedded information and the binary number filled in each position in the template.

In some embodiments, the apparatus further includes:

a second matching module, configured to: match, in response to that a video is formed by using a motion shot, a feature extracted from an embedding region in a reference frame of the video with a feature extracted from the to-be-processed frame; and a region determining module, configured to: determine, in response to successful matching, that the to-be-processed frame includes an embedding region corresponding to the embedding region in the reference frame.

In some embodiments, the apparatus further includes:

a region transform module, configured to: in response to that a video is formed by using a motion shot, before the controlling update of the model based on a subsequent to-be-processed frame of the reference frame, transform the embedding region in the to-be-processed frame, so that a position of each pixel in the transformed embedding region is consistent with a position of a corresponding pixel in the embedding region in the reference frame; and a template inverse transform module, configured to: before the applying the template to to-be-embedded information, perform inverse transform of the transform on the template, so that a position of each binary number in the transformed template is consistent with a position of a corresponding pixel in the embedding region in the to-be-processed frame.

In some embodiments, the apparatus further includes:

a region positioning module, configured to: position, in response to that a video is formed by using a static shot, a region of a corresponding position in the to-be-processed frame based on a position of the embedding region in the reference frame, to determine the embedding region in the to-be-processed frame.

In some embodiments, the apparatus further includes:

a first determining module, configured to: determine, in response to that first color space distribution of the embedding region in the to-be-processed frame and first color space distribution of the embedding region in the reference frame meet a first difference condition, that the embedding region in the reference frame is occluded by the foreground; and a second determining module, configured to: determine, in response to that second color space distribution of the embedding region in the to-be-processed frame and second color space distribution of the embedding region in the reference frame meet a second difference condition, that illumination of the embedding region in the to-be-processed frame changes.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an example in which the method provided in this embodiment of this disclosure is implemented by hardware, the method provided in this embodiment of this disclosure may be directly executed by using the processor 410 in the form of a hardware decoding processor, for example, one or more application specific integrated circuits (ASICs), DSPs, programmable logic devices (PLDs), complex programmable logic devices (CPLDs), field-programmable gate arrays (FPGAs), or other electronic elements, to execute the method provided in this embodiment of this disclosure.

An embodiment of this disclosure provides a storage medium storing executable instructions. When the executable instructions are executed by a processor, the processor is caused to perform the method provided in the embodiments of this disclosure, for example, the method shown in FIG. 3 to FIG. 6.

In some embodiments, the storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In conclusion, in this embodiment of this disclosure, a model can be constructed based on a pixel distribution characteristic of an embedding region in a reference frame, occlusion detection can be performed on an embedding region in a to-be-processed frame, and a model parameter is updated based on an occlusion detection result, so that background pixel distribution of the embedding region in the reference frame can be fitted into the embedding region in the to-be-processed frame, and embedded information can be better incorporated into a background of a video without occluding a foreground, thereby bringing better viewing experience. In addition, for a video formed by using a motion shot, an embedding region is determined by using a feature point, and pixels in the embedding region in the to-be-processed frame are mapped to consistent positions in the reference frame by means of transform, without using a motion tracking manner, so that real-time performance is higher and robustness is stronger.

The foregoing descriptions are merely embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A method for embedding information into a video, applicable to an electronic device and comprising:
constructing a model for each of a plurality of pixels comprised by a first embedding region in a reference frame of the video, the model conforming to a pixel distribution characteristic of the first embedding region;
controlling update of the model based on a subsequent to-be-processed frame of the reference frame;
identifying a background and a foreground of a second embedding region in the to-be-processed frame based on the model;
generating a template used for occluding the background and exposing the foreground;
applying the template to to-be-embedded information to generate an updated to-be-embedded information by occluding region of the to-be-embedded information corresponding to the foreground, by steps comprising:
performing a multiplication operation on the pixels of the to-be-embedded information with a number filled in a corresponding position in the template; and
overlaying the second embedding region with the updated to-be-embedded information, so that the foreground of the second embedding region is devoid of occlusion by the overlaid to-be-embedded information.

2. The method according to claim 1, wherein constructing the model conforming to the pixel distribution characteristic of the first embedding region in the reference frame comprises:
initializing, for each of the plurality of pixels, at least one sub-model corresponding to the pixel and a weight corresponding to the at least one sub-model; and
mixing, based on the initialized weight, the at least one sub-model constructed for each of the plurality of pixels to form a model corresponding to the pixel.

3. The method according to claim 1, wherein controlling the update of the model based on the subsequent to-be-processed frame of the reference frame comprises:
reducing, in response to that the second embedding region in the to-be-processed frame is occluded by the foreground, a rate at which the model is fitted into the second embedding region in the to-be-processed frame; and
increasing, in response to that the second embedding region in the to-be-processed frame is not occluded by the foreground and that illumination of the second embedding region in the to-be-processed frame changes, the rate at which the model is fitted into the second embedding region in the to-be-processed frame.

4. The method according to claim 1, wherein controlling the update of the model based on the subsequent to-be-processed frame of the reference frame comprises:
updating, in response to that a pixel in the second embedding region in the to-be-processed frame matches at least one sub-model in a corresponding model, a parameter of the matched sub-model while keeping a parameter of an unmatched sub-model to the pixel in the corresponding model unchanged.

5. The method according to claim 1, wherein identifying the background and the foreground of the second embedding region in the to-be-processed frame based on the model comprises:
matching a color value of each pixel comprised in the second embedding region in the to-be-processed frame with a sub-model in the model corresponding to the pixel; and
identifying the pixel as a pixel of the background or as a pixel of the foreground according to if the pixel matches a sub-model in the model corresponding to the pixel.

6. The method according to claim 1, wherein generating the template used for occluding the background and exposing the foreground comprises:

filling, for a pixel that is in the second embedding region in the to-be-processed frame and that is identified as a pixel of the background, a binary number one in a corresponding position in the template; and filling, for a pixel that is in the second embedding region in the to-be-processed frame and that is identified as a pixel of the foreground, a binary number zero in a corresponding position in the template.

7. The method according to claim 1, wherein the method further comprises:

matching, in response to the video with a dynamic image range, a feature extracted from the first embedding region in the reference frame of the video with a feature extracted from the to-be-processed frame; and determining, in response to a successful matching, that the to-be-processed frame comprises the second embedding region corresponding to the first embedding region in the reference frame of the video.

8. The method according to claim 1, wherein the method further comprises:

in response to the video having a dynamic image range:

before controlling the update of the model based on the subsequent to-be-processed frame of the reference frame, transforming the second embedding region in the to-be-processed frame, so that a position of each pixel comprised in the transformed second embedding region is consistent with a position of a corresponding pixel comprised in the first embedding region in the reference frame; and before applying the template to the to-be-embedded information, transforming the template inversely to the transformation of the second embedding region in the to-be-processed frame, so that a position of each binary number in the inversely-transformed template is consistent with a position of a corresponding pixel in the second embedding region in the to-be-processed frame.

9. The method according to claim 1, wherein the method further comprises:

positioning, in response to the video having a static image range, a region of a corresponding position in the to-be-processed frame based on a position of the first embedding region in the reference frame, to determine the second embedding region in the to-be-processed frame.

10. The method according to claim 1, wherein the method further comprises:

determining, in response to that a difference between first color space distribution of the second embedding region in the to-be-processed frame and a first color space distribution of the first embedding region in the reference frame meets a first condition, that the second embedding region in the to-be-processed frame is occluded by the foreground.

11. The method according to claim 1, wherein the method further comprises:

determining, when a difference between second color space distribution of the embedding region in the to-be-processed frame and a second color space distribution of the first embedding region in the reference frame meets a second condition, that illumination of the second embedding region in the to-be-processed frame changes.

12. An electronic device, comprising:

a memory, configured to store executable instructions; and at least one processor, configured to, when executing the executable instructions stored in the memory, perform the steps comprising:

constructing a model for each of a plurality of pixels comprised by a first embedding region in a reference frame of a video, the model conforming to a pixel distribution characteristic of the first embedding region;

controlling update of the model based on a subsequent to-be-processed frame of the reference frame;

identifying a background and a foreground of a second embedding region in the to-be-processed frame based on the model;

generating a template used for occluding the background and exposing the foreground;

applying the template to to-be-embedded information to generate an updated to-be-embedded information by occluding region of the to-be-embedded information corresponding to the foreground, by steps comprising:

performing a multiplication operation on the pixels of the to-be-embedded information with a binary number filled in a corresponding position in the template; and overlaying the second embedding region with the updated to-be-embedded information, so that the foreground of the second embedding region is devoid of occlusion by the overlaid to-be-embedded information.

13. The electronic device of claim 12, wherein the at least on processor is further configured to construct the model conforming to the pixel distribution characteristic of the first embedding region in the reference frame by performing the steps comprising:

initializing, for each of the plurality of pixels, at least one sub-model corresponding to the pixel and a weight corresponding to the at least one sub-model; and mixing, based on the initialized weight, the at least one sub-model constructed for each of the plurality of pixels to form a model corresponding to the pixel.

14. The electronic device of claim 12, wherein the at least on processor is further configured to control the update of the model based on the subsequent to-be-processed frame of the reference frame by performing the steps comprising:

reducing, in response to that the second embedding region in the to-be-processed frame is occluded by the foreground, a rate at which the model is fitted into the second embedding region in the to-be-processed frame; and increasing, in response to that the second embedding region in the to-be-processed frame is not occluded by the foreground and that illumination of the second embedding region in the to-be-processed frame changes, the rate at which the model is fitted into the second embedding region in the to-be-processed frame.

15. The electronic device of claim 12, wherein the at least on processor is further configured to control the update of the model based on the subsequent to-be-processed frame of the reference frame by performing the step comprising:

updating, in response to that a pixel in the second embedding region in the to-be-processed frame matches at least one sub-model in a corresponding model, a parameter of the matched sub-model while keeping a parameter of an unmatched sub-model to the pixel in the corresponding model unchanged.

16. The electronic device of claim 12, wherein the at least on processor is further configured to identify the background and the foreground of the second embedding region in the to-be-processed frame based on the model by performing the steps comprising:

matching a color value of each pixel comprised in the second embedding region in the to-be-processed frame with a sub-model in the model corresponding to the pixel; and identifying the pixel as a pixel of the background or as a pixel of the foreground according to if the pixel matches a sub-model in the model corresponding to the pixel.

17. The electronic device according to claim 12, wherein the at least on processor is further configured to generate the template used for occluding the background and exposing the foreground by performing the steps comprising:

filling, for a pixel that is in the second embedding region in the to-be-processed frame and that is identified as a pixel of the background, a binary number one in a corresponding position in the template; and filling, for a pixel that is in the i-second embedding region in the to-be-processed frame and that is identified as a pixel of the foreground, a binary number zero in a corresponding position in the template.

18. The electronic device according to claim 12, wherein the at least on processor is further configured to in response to the video having a dynamic image range:

before controlling the update of the model based on the subsequent to-be-processed frame of the reference frame, transforming the second embedding region in the to-be-processed frame, so that a position of each pixel comprised in the transformed second embedding region is consistent with a position of a corresponding pixel comprised in the first embedding region in the reference frame; and before applying the template to the to-be-embedded information, transforming the template inversely to the transformation of the second embedding region in the to-be-processed frame, so that a position of each binary number in the inversely-transformed template is consistent with a position of a corresponding pixel in the second embedding region in the to-be-processed frame.

19. A non-transitory computer-readable storage medium, storing executable instructions, configured to, when executed by at least one processor, cause an electronic device to perform the steps, comprising:

constructing a model for each of a plurality of pixels comprised by a first embedding region in a reference frame of a video, the model conforming to a pixel distribution characteristic of the first embedding region;

controlling update of the model based on a subsequent to-be-processed frame of the reference frame;

identifying a background and a foreground of a second embedding region in the to-be-processed frame based on the model;

generating a template used for occluding the background and exposing the foreground;

applying the template to to-be-embedded information to generate an updated to-be-embedded information by occluding region of the to-be-embedded information corresponding to the foreground, by steps comprising:

performing a multiplication operation on the pixels of the to-be-embedded information with a binary number filled in a corresponding position in the template; and overlaying the second embedding region with the updated to-be-embedded information, so that the foreground of the second embedding region is devoid of occlusion by the overlaid to-be-embedded information.

20. The non-transitory computer-readable storage medium according to claim 19, wherein the executable instructions is further configured to, when executed by at least one processor, cause an electronic device to perform the steps, comprising:

in response to the video having a dynamic image range, before controlling the update of the model based on the subsequent to-be-processed frame of the reference frame, transforming the second embedding region in the to-be-processed frame, so that a position of each pixel comprised in the transformed second embedding region is consistent with a position of a corresponding pixel comprised in the first embedding region in the reference frame; and before applying the template to the to-be-embedded information, transforming the template inversely to the transformation of the second embedding region in the to-be-processed frame, so that a position of each binary number in the inversely-transformed template is consistent with a position of a corresponding pixel in the second embedding region in the to-be-processed frame.

* * * * *